United States Patent
Berry

(10) Patent No.: US 8,677,242 B2
(45) Date of Patent: Mar. 18, 2014

(54) DYNAMIC POSITIONING OF TIMELINE MARKERS FOR EFFICIENT DISPLAY

(75) Inventor: Michael Berry, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 526 days.

(21) Appl. No.: 12/956,819

(22) Filed: Nov. 30, 2010

(65) Prior Publication Data

US 2013/0132839 A1 May 23, 2013

(51) Int. Cl.
*G06F 3/048* (2013.01)
*H04N 21/47* (2011.01)

(52) U.S. Cl.
CPC .............. *H04N 21/47* (2013.01); *G06F 3/048* (2013.01)
USPC .............................. 715/723; 715/721; 725/41

(58) Field of Classification Search
USPC ................ 715/202, 216, 719–726, 802, 805, 715/765–769; 725/41, 52
See application file for complete search history.

(56) References Cited

U.S. PATENT DOCUMENTS

| | | | | |
|---|---|---|---|---|
| 5,519,828 A | * | 5/1996 | Rayner | 715/723 |
| 7,398,002 B2 | * | 7/2008 | Hsiao et al. | 386/280 |
| 7,546,532 B1 | * | 6/2009 | Nichols et al. | 715/716 |
| 7,561,160 B2 | * | 7/2009 | Fukuya | 345/474 |
| 2004/0034869 A1 | * | 2/2004 | Wallace et al. | 725/45 |
| 2004/0196377 A1 | * | 10/2004 | Tikka et al. | 348/207.1 |
| 2004/0199395 A1 | * | 10/2004 | Schulz | 704/278 |
| 2006/0184980 A1 | * | 8/2006 | Cole | 725/88 |
| 2007/0022159 A1 | * | 1/2007 | Zhu et al. | 709/204 |
| 2008/0256448 A1 | * | 10/2008 | Bhatt | 715/716 |
| 2009/0241048 A1 | * | 9/2009 | Augustine et al. | 715/769 |
| 2010/0169786 A1 | * | 7/2010 | O'Brien et al. | 715/738 |
| 2010/0218097 A1 | * | 8/2010 | Herberger et al. | 715/716 |
| 2010/0278504 A1 | * | 11/2010 | Lyons et al. | 386/52 |
| 2010/0281380 A1 | * | 11/2010 | Langmacher et al. | 715/723 |
| 2011/0154197 A1 | * | 6/2011 | Hawthorne et al. | 715/704 |

* cited by examiner

*Primary Examiner* — Steven Sax
(74) *Attorney, Agent, or Firm* — Wolfe-SBMC

(57) ABSTRACT

Systems and methods are presented for simultaneously displaying a plurality of timeline markers within a timeline marker region of an interface for a video application. The timeline marker region may include multiple display tracks within which numerous timeline markers may be positioned for simultaneous display. At a given instant, each timeline marker may appear in a particular one of the multiple display tracks, and the entire collection of timeline markers being simultaneously displayed at that instant may be arranged so that all of the timeline markers appear separately from each other. Pairs of timeline markers which coincide with non-overlapping portions of the timeline may be placed in the same display track, while timeline markers that coincide with overlapping portions of the timeline may be put into separate display tracks, thus guaranteeing that all the timeline markers appear separately from each other.

20 Claims, 16 Drawing Sheets

DYNAMIC POSITIONING OF TIMELINE MARKERS FOR EFFICIENT DISPLAY

BACKGROUND

Current video editing systems sometimes include video markers used for logging video footage. Such markers may be associated with the video timeline and may be referred to as timeline markers or temporal markers. A video timeline marker can be constructed to correspond with a particular in point, or starting point, and a particular out point, or stopping point, of a video clip. The video timeline marker may thus be associated with some portion, or with the entirety, of a video timeline representing a video presentation. A timeline marker can contain data that is particular to its associated portion of the timeline. For example, the timeline marker may contain names, description, and comments for a portion of a video clip. Timeline markers and their data can be used to quickly retrieve a clip, or to locate a particular portion of a video presentation. A collection of timeline markers developed during a logging phase prior to editing a video presentation can be viewed later during an editing phase. Comment fields, and other data or metadata contained in the video timeline markers, may be searched to facilitate rapid navigation of an associated video presentation.

Some systems confine all timeline markers associated with a video timeline to a single fixed track, with each timeline marker aligned with its designated portion of the video timeline, making it impossible to simultaneously display two timeline markers that are aligned with overlapping portions of the timeline without having the markers themselves overlap within the single fixed track. Some such systems may prohibit the simultaneous display within the single fixed track of two timeline markers that are aligned with overlapping portions of the timeline. For example, if a new timeline marker is to be added to the single fixed track, and the new timeline marker corresponds to a portion of the timeline that is aligned with an existing timeline marker, then the addition of the new timeline marker may simply overwrite the existing timeline marker. Other similar systems may allow the simultaneous placement of two timeline markers that are aligned with overlapping portions of the timeline, with the result that one of the timeline markers may occlude or completely hide the other, so that the two timeline markers are not simultaneously visible. Either variant limits the practical functionality of the timeline markers.

Other systems may provide a limited number of fixed tracks for displaying timeline markers, but as in the case of a single fixed track, the limited number of fixed tracks may limit the number of timeline markers which are aligned with overlapping portions of the timeline and which can be displayed so that they are simultaneously visible without obstruction. Some such systems dedicate each fixed track to a particular type of timeline marker, so that a given track may not be capable of displaying two different types of timeline markers.

In each of these implementations, the region for displaying timeline markers may consist of an immutable arrangement of display tracks that, when sparsely populated with timeline markers, leave empty places in the display tracks that waste space in the user interface.

The burden of choosing a track for displaying each timeline marker may fall upon the user, thus diverting attention from the substance of the task at hand, and requiring the user to spend time on a tedious, repetitive job of manually managing the placement of timeline markers. For example, the user may have to manually place, in two separate tracks, two timeline markers that are associated with overlapping portions of the timeline. If the display tracks are rigidly dedicated to particular types of timeline markers, the user may be required to manually place a newly-added timeline marker in a display track which matches the type of the new timeline marker.

Some existing video editing systems may not provide any timeline markers which can be aligned with corresponding time intervals of a video timeline, but instead rely on a detached list containing logging data for various portions of video clips or presentations. This approach sacrifices the immediate and direct sense of orientation inherent in timeline markers which physically align with their own designated portions of a video presentation.

SUMMARY

The description herein discloses various embodiments of systems and methods for simultaneously displaying a plurality of timeline markers within a timeline marker region of an interface for a video application. The timeline marker region may comprise multiple display tracks. Each of the plurality of timeline markers appears in one of the multiple display tracks, such that the plurality of timeline markers are separate from each other. An in point of each of the plurality of timeline markers is aligned with a designated starting point on a timeline, and an out point of each of the plurality of timeline markers is aligned with a designated ending point on the timeline. No empty display track appears between two display tracks that each contain one or more of the plurality of timeline markers. In response to altering the plurality of timeline markers by modifying or deleting one of the plurality of timeline markers, or by adding a new timeline marker to the plurality of timeline markers, the method includes shifting one or more of the plurality of timeline markers from one of the multiple display tracks to another of the multiple display tracks, and simultaneously displaying the altered plurality of timeline markers so that, subsequent to the shifting, no empty display track appears between two display tracks that each contain one or more of the altered plurality of timeline markers.

In various embodiments, a memory is coupled to a processor, and the memory stores program instructions executable by the processor to implement a timeline marker management component. In these embodiments, the functions described above may be performed via the timeline marker management component. In some embodiments, the system may include a computer-readable storage medium storing program instructions that are computer-executable to perform these functions.

Figure 1:
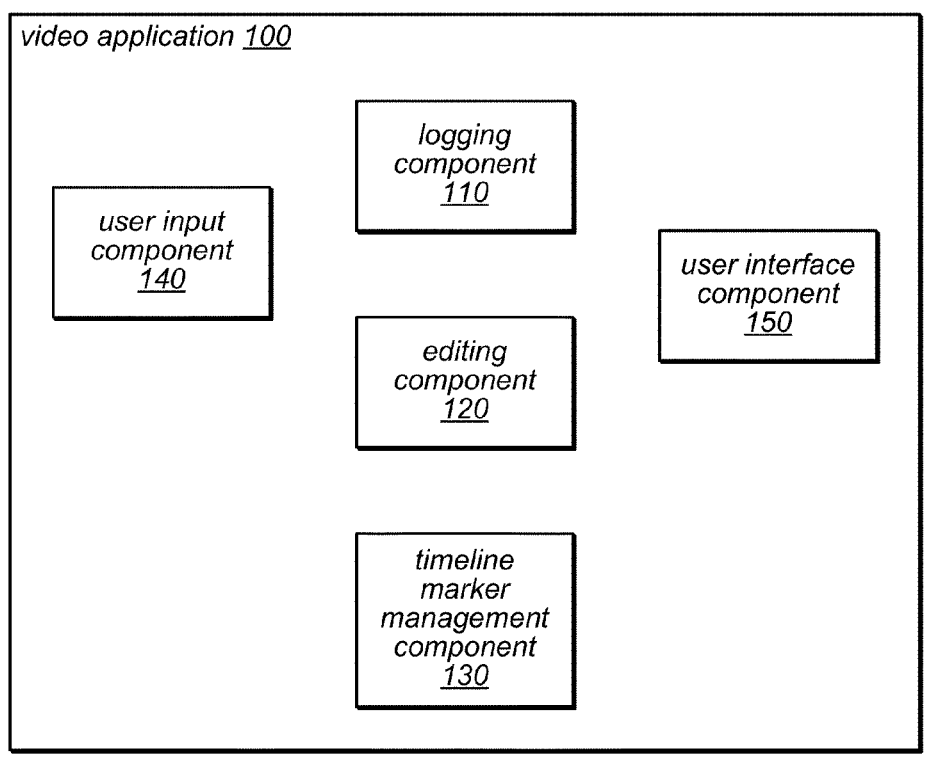
FIG. 1 illustrates one embodiment of system components of a video application that manages timeline markers in an interface.

While the present disclosure is described herein by way of example for several embodiments and illustrative drawings, those skilled in the art will recognize that the disclosure is not limited to the embodiments or drawings described. It should be understood, that the drawings and detailed description thereto are not intended to limit the claims to the particular form disclosed, but that on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is understood that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

The following discussion explores various embodiments of systems and methods for simultaneously displaying a plurality of timeline markers within a timeline marker region of an interface for a video application. The timeline marker region may include multiple display tracks within which numerous timeline markers may be positioned for simultaneous display. See FIG. 15, step 1502. At a given instant, each timeline marker may appear in a particular one of the multiple display tracks, and the entire collection of timeline markers being simultaneously displayed at that instant may be arranged so that all of the timeline markers appear separately from each other. Pairs of timeline markers which coincide with non-overlapping portions of the timeline may be placed in the same display track, while timeline markers that coincide with overlapping portions of the timeline may be put into separate display tracks, thus guaranteeing that all the timeline markers appear separately from each other.

As illustrated in the embodiments shown in FIGS. 2-14, the timeline markers in the various display tracks of the timeline marker region may appear adjacent to or in near proximity to a video timeline of an interface for a video application. Each of the timeline markers may be aligned with the timeline so that an "in" point of the timeline marker coincides with a designated starting or beginning point on the timeline, that is, with an "in" point of the timeline, and an "out" point of the timeline marker coincides with a designated stopping or ending point on the timeline, that is, with an "out" point of the timeline. In this way, each timeline marker may be associated by physical positioning, relative to the timeline, with a particular time interval. Therefore a timeline marker's in and out points may define or designate a particular time interval of the timeline, associating the timeline marker with that particular time interval of the timeline. According to some embodiments, a timeline marker's "in" point may be set at one endpoint of the timeline marker, and a timeline marker's "out" point may be set at the other endpoint of the timeline marker. For some other embodiments, the "in" point and the "out" point of a timeline marker may be offset from the endpoints of the timeline marker. Note that the timeline marker region may be, but is not necessarily, displayed in conjunction with a timeline display of the corresponding video, such as in a specific timeline window of the video application. In other embodiments, the timeline marker region may be displayed in conjunction with other content, such as within a story board window of the video application, or within its own dedicated window.

Each timeline marker may contain data that is particular or specific to the portion of the timeline with which the timeline marker coincides. For example, a timeline marker may contain names, descriptive material, parameters, and metadata, or other information that applies to a particular time interval of a video clip or video presentation. Timeline markers themselves may be typed according to functionality. For example, one type of timeline marker may be dedicated to performing comment functions, while another type of timeline marker may be dedicated to performing flash video cueing functions. The information contained in the various types of timeline markers may be searched to facilitate rapid navigation and retrieval within an associated video presentation, and thus provide a powerful tool for researching, editing or producing video material. Certain timeline markers may also contain instructions that may be invoked, automatically or manually, when the video is being played or when the video is being processed by any application configured to recognize the instructions.

Timeline markers may thus be used to log video footage with a variety of pertinent data. Video logging may involve labeling video footage according to its content using numerous timeline markers of various types. In some instances, some logging functions may be performed before or during video shooting; shots may be specified in advance of shooting to have an exact time duration, or logging indications may be applied during the shooting. Other logging may be performed following the recording of video material. Logging video footage may be an important prerequisite to efficient and complete editing.

Timeline markers themselves may be malleable, permitting modification to the data they contain, including the addition of new data or deletion of old data. A timeline marker's in and out points may be redefined to designate a different time interval of the timeline, so that the timeline marker's in point may be adjusted to coincide with a different starting point on the timeline, and its "out" point may be reset to align with a different stopping point or ending point on the timeline. New timeline markers may be added, and existing timeline markers may be modified or deleted, or may be temporarily suppressed from active display by filtering, or by some other mechanism. The timeline markers themselves may thus form a dynamic collection, rather than a static set of fixed pegs. See FIG. 15, step 1504.

The dynamic character of the timeline markers may require a corresponding dynamism in presenting them. The systems and methods described herein allow a dynamic, simultaneous display of the timeline markers that maintains alignment of the in point of each timeline marker with its designated beginning or starting point on the timeline; maintains alignment of the out point of each timeline marker with its designated stopping or ending point on the timeline; and maintains separation, into two distinct, non-intersecting tracks of the timeline marker region, of each two timeline markers whose time intervals overlap, so that the collection of timeline markers is displayed at any given instant with the markers positioned separately from each other.

Dynamic presentation of timeline markers may be achieved by dynamically reflowing timeline markers into various display tracks of a timeline marker region in response to commands to alter the display of the timeline markers, or in response to modifying or deleting one or more existing timeline markers, or in response to adding one or more new timeline markers to the collection to be displayed. Such changes to the collection of timeline markers designated for current display may automatically trigger a shifting of one or more existing timeline markers from one display track to another display track, and the shifting of timeline markers may free space in some display tracks while filling space in others. See FIG. 15, step 1506. In some instances, the dynamic reflowing of the timeline markers may completely empty one or more display tracks, so that those display tracks may be removed from current display. See FIG. 15, step 1508. The dynamic reflowing of the timeline markers may also cause an addition of one or more display tracks to the timeline marker region to accommodate displaying a specified collection of timeline markers.

In general, the timeline markers may be automatically displayed so that no empty display tracks appear between two display tracks that each contain one or more timeline markers, thus conserving space in the timeline marker region of the interface. Conservation of space required to simultaneously display a collection of several timeline markers may be achieved by automatically and efficiently positioning the timeline markers into a minimal number of display tracks. The automatic positioning or repositioning of timeline markers into display tracks of the timeline marker region of the interface may be performed according to a set of rules that may be based either on heuristics or on algorithmic techniques, or both. The rules for automated positioning of the timeline markers may vary according to numerous embodiments, and may be modifiable by a user in some instances. The rules may be based on topological methods for packing, fitting, stacking, or compacting. In some embodiments, the rules may allow timeline markers of any given type to be placed in any given display track, without regard to the type of the timeline marker, thus allowing complete freedom in the choosing of display tracks in which to position the timeline markers. The rules for positioning the timeline markers may include shifting one or more timeline markers from one display track to another display track in order to maintain separation of the timeline markers while preserving alignment of the timeline markers with designated portions of the timeline itself. The rules may also call for thinning each of the timeline markers to diminish their combined footprint whenever the number of display tracks used in displaying the timeline markers exceeds a preset threshold. The positioning or repositioning of the timeline markers may be performed automatically, so that the system automatically places the timeline markers into various display tracks of the timeline marker region without requiring user assistance. See FIG. 15, step 1506, 1508, and 1510.

A viewer of the interface for the video application may thus always be presented with a clear and compact representation of the collection of timeline markers being currently displayed, a representation that shows each of the simultaneously displayed timeline markers as distinct from each of the other timeline markers in the simultaneous display, while conserving space within the interface.

The following paragraphs describe techniques for simultaneously displaying timeline markers within a timeline marker region of an interface for a video application, comprising an automated and dynamic flowing and reflowing of timeline markers. The automated and dynamic flowing and reflowing of timeline markers into various display tracks of the timeline marker region assures a clear, space-efficient, and simultaneous rendering of timeline markers in the timeline marker region of an interface for a video application.

Dynamic Positioning of Timeline Markers for Efficient Display

FIG. 1 illustrates one embodiment of basic components in a system for space-efficient visual rendering of timeline markers in a timeline marker region of an interface for a video application. Video application 100 may correspond to a software application running on a computing machine, and may comprise a collection of components that varies according to various embodiments. In the embodiment illustrated in FIG. 1, video application 100 comprises a logging component 110, which may exist as a separate module that communicates with other components of video application 100, or may be directly encoded into video application 100. Logging component 110 may interact with other components of video application 100 to perform various logging functions. Logging component 110 may cooperate with timeline marker management component 130, user input component 140, and user interface component 150 to provide assorted elements of a user interface for video application 100. Logging component 110 may also manage the ongoing storage of timeline markers and their associated data as timeline markers are modified, deleted, and created.

For example, the components of video application 100 may cooperate to provide a variety of video logging panels within a user interface for video application 100. FIGS. 2-14 illustrate an embodiment that includes several such video logging panels. A panel labeled "Marker List" that includes an interactive list of existing timeline markers is located at the top of the interface between a "Monitor" panel on the left and a "Marker" panel on the right. Each individual timeline marker shown in the "Marker List" panel may be selected to trigger an automatic display within the "Marker" panel of one or more of data entry fields, informational data, and controls for the selected individual timeline marker. The various elements shown inside the "Marker" panel may be used to fill in data for the selected individual timeline marker, to set a correspondence between an in point of the selected individual timeline marker and a beginning or starting point on the video timeline shown below, to set a correspondence between an out point of the selected individual timeline marker and an ending or stopping point on the same video timeline, to set or change the type of the selected individual timeline marker, and to perform any of numerous other functions on the selected individual timeline marker, according to various embodiments. A "Marker Templates" panel shown directly below the "Marker List" panel may permit selection of one of the marker types shown in the marker templates panel to initiate the creation of a new timeline marker for addition to the collection of existing timeline markers. The various components of video application 100 may also work together to display the timeline markers in display tracks of the timeline marker region of the "Time View" panel, which is shown in the lower half of the interface embodiment illustrated in FIGS. 2-14. In particular, timeline marker management component 130 may include a rule-based mechanism for dynamically flowing and reflowing the timeline markers into the display tracks, as described above.

Once a user has established a collection of timeline markers for one or more video clips represented on the timeline, the timeline markers may be used to organize and index the video clips in a video library database, and to quickly navigate and retrieve various clips that have been so marked. The editing of marked video clips via editing component 120 may be greatly simplified and streamlined by using the timeline markers and the data they contain for retrieval, navigation, and guidance during the editing phase.

Depending on the embodiment, video application 100 may be realized as a stand-alone logging application separate from a video editing application, or, alternatively, may be incorporated as a component of a video editing application, or may contain its own video editing component.

FIGS. 2-14 illustrate one embodiment of a user interface for a system that manages the simultaneous, dynamic display of timeline markers within a timeline marker region of an interface for a video application. Each illustration shows the same illustrative interface of a video application during various stages of operations to log video footage with timeline markers. The timeline markers appear in parallel display tracks of a timeline marker region inside a panel labeled "Time View." Immediately below the display tracks of the timeline marker region is a timeline for the video footage currently loaded into the video application. In the illustrated embodiment, the timeline contains both individual video frames, representing segments of video footage, and corresponding audio wave forms displayed in parallel audio tracks that coincide with the video content. In other embodiments, the timeline may contain media clips that contain only video content, or only audio content, or both. In the illustrated embodiment shown in FIGS. 2-14, the display tracks of the timeline marker region are not delimited by border lines or by any other visible markings or distinguishing patterns or coloring; in this instance, the notion of display tracks, or display levels, is only implicit, and is implied by the arrangement of the timeline markers into apparent horizontal rows comprising distinct, parallel non-intersecting portions of the timeline marker region. In other embodiments, display tracks or paths may be explicitly distinguished by borderlines or patterning or coloring that reveals each display track or path or level as a distinct element or portion of the timeline marker region.

Although FIGS. 2-14 show the timeline and the timeline markers displayed in adjacent tracks in a horizontal orientation, other embodiments may permit the timeline and its accompanying timeline marks to assume a vertical orientation, or any other orientation convenient to the task at hand. For example, the timeline and the timeline marker region may be set into an arc or curve, or into a polygonal path whose orientation depends on orientation of the content of the video footage. The techniques presented herein for managing the simultaneous display of timeline markers within the timeline marker region may be applied regardless of the shape or configuration of the timeline and the timeline marker region. Moreover, the timeline marker region may be displayed at various locations of the interface, according to individual embodiments.

In addition to the direct display of timeline markers in various display tracks of the timeline marker region of the "Time View" panel, the embodiment illustrated in FIGS. 2-14 provides a separate interactive list of the existing timeline markers in the "Marker List" panel shown at the top of the interface between the "Monitor" panel and the "Marker" panel. Other embodiments may or may not include a listing of the timeline markers that is separate from the direct display of timeline markers in various display tracks of the timeline marker region. For embodiments which do display a separate listing of the timeline markers, the separate listing may be positioned at various locations within the interface, according to various embodiments.

As mentioned above, each individual timeline marker listed in the "Marker List" panel may be individually selected to automatically reveal a template that includes one or more of data entry fields, informational data, and controls for the selected individual timeline marker. The template may open inside the separate "Marker" panel shown immediately to the right of the "Marker List" panel in FIGS. 2-14. The various elements shown inside the "Marker" panel may be used to fill in data for the selected individual timeline marker, to set a correspondence between an in point of the selected individual timeline marker and a beginning or starting point on the video timeline shown below, to set a correspondence between an out point of the selected individual timeline marker and an ending or stopping point on the same video timeline, to set or change the type of the selected individual timeline marker, and to perform any of numerous other functions on the selected individual timeline marker, according to various embodiments.

In the embodiment illustrated in FIGS. 2-14, timeline marker management component 130, user input component 140, and user interface component 150 function together to enable user selection of any of the existing timeline markers shown in various layers or tracks of the timeline marker region of the "Time View" panel, and to enable user selection of any of the interactive list elements in the list of existing timeline markers shown in the "Marker List" panel. Selection of either a timeline marker in the "Time View" panel, or of its corresponding member in the "Marker List" panel, automatically highlights both the timeline marker in the "Time View" panel and its corresponding member in the "Marker List" panel, and also triggers automatic display, within the "Marker" panel, of one or more of data entry fields, informational data, and controls for the selected individual timeline marker. In the embodiment illustrated in FIG. 14, "Test Marker 0" is selected, and a corresponding template is displayed inside the "Marker" panel. In this and in some other embodiments, various means are implemented for opening a data entry field for entering data for data-displaying timeline markers. Data may also be entered for non-data-displaying timeline markers. Some of the data entered for both types of timeline markers may not be displayed in the timeline marker itself. Timeline marker data that is not displayed in the timeline marker itself may be stored for another purpose, including display in another part of the interface, or in some other application.

Figure 14:
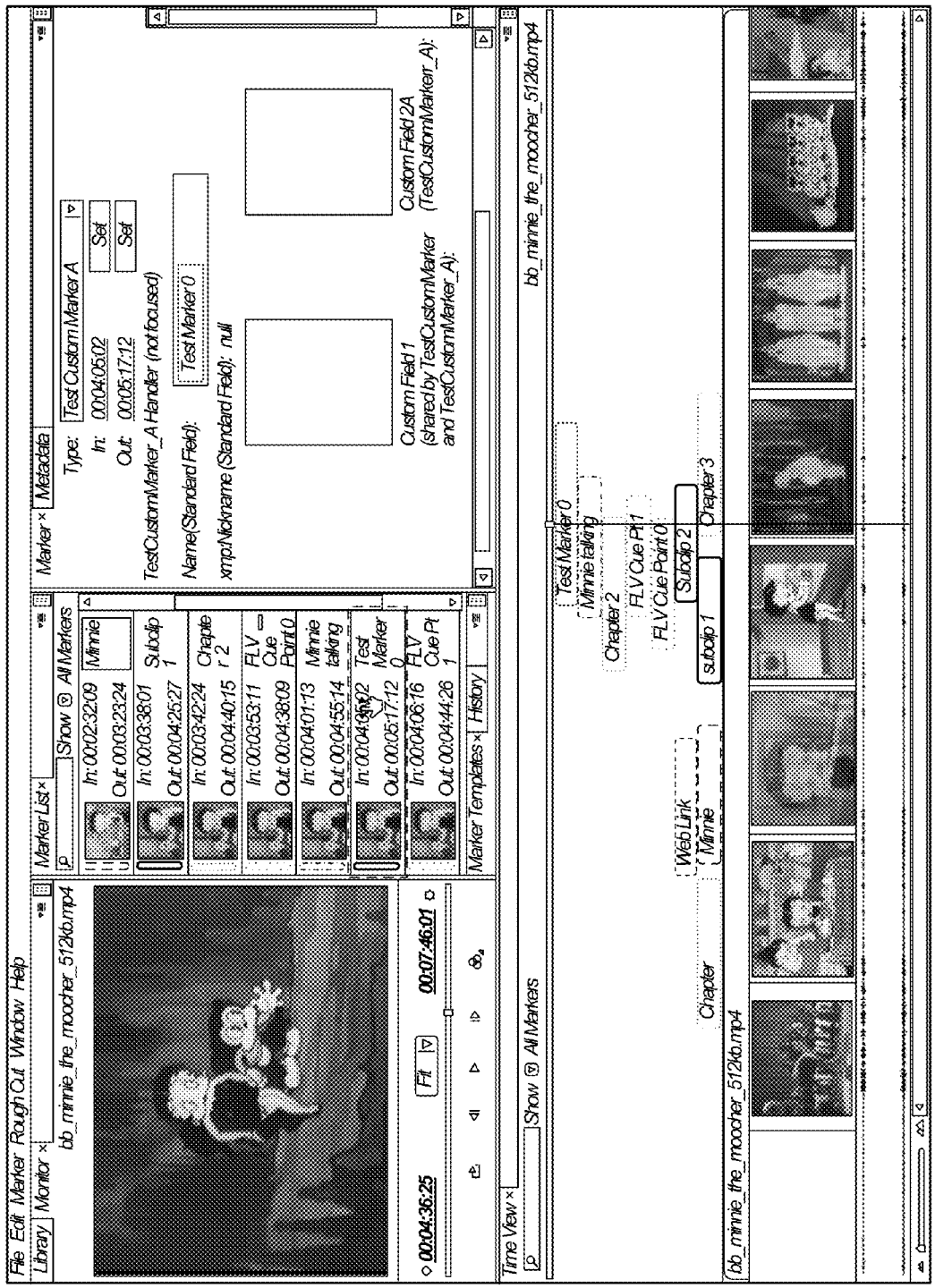

A user may modify the current name or enter a new name in the name field for the timeline marker currently labeled "Test Marker 0" by entering text into the name field shown in the "Marker" panel in FIG. 14. The text entered into the name field is reflected in the label that appears on the timeline marker currently labeled "Test Marker 0." A user may also enter data into the custom fields shown inside the "Marker" panel. Data entered in some of the fields may be shared by one or more timeline markers, while data entered in other fields may belong exclusively to the currently selected timeline marker. The fields and controls shown in the "Marker" panel may vary from one timeline marker to another within a single embodiment of the methods and systems presented herein, and may also vary from one embodiment to another. According to some embodiments, one or more of the constituent fields and controls displayed in the "Marker" panel for the selected timeline marker may be customized according to preference. User input component 140 may receive the data entered by the user for one or more of the data-displaying timeline markers, and in response to receiving the data, user interface component 150 and timeline marker management component 130, operating either separately or jointly, may display the received data in the one or more data-displaying timeline markers.

According to different embodiments, both the correspondence between the in point of the selected individual timeline marker and an in point of the video timeline shown below, and the correspondence between the out point of the selected individual timeline marker and an out point of the same video timeline, may be set using any of numerous means presented by logging component 110, timeline marker management component 130, user input component 140, and user interface component 150. For example, a user may activate a special mode for navigating the vertical timeline cursor back and forth across the timeline in the "Time View" panel by placing the mouse cursor over the "In" field digits shown inside the selected element in the "Marker List" panel, or by placing the mouse cursor over the "In" field digits shown in the "In" field to the left of the "Set" button in the "Marker" panel. Following the activation of this special mode, a user may navigate the vertical timeline cursor in either direction across the timeline by pressing arrow keys on the keyboard, or by any other means of supplying directional input for the vertical timeline cursor. Alternatively, the user may move the vertical timeline cursor to any desired position along the length of the timeline either by dragging the square button shown on the track inside the "Monitor" panel, or by dragging the square button attached to the end of the vertical timeline cursor in the "Time View" panel. Subsequent to positioning the vertical timeline cursor, the user may activate the appropriate one of the two "Set" buttons shown in the "Marker" panel in order to establish either a correspondence between the in point of the selected individual timeline marker and a beginning or starting point on the video timeline shown below, or else a correspondence between the out point of the selected individual timeline marker and an ending or stopping point on the same video timeline.

In the embodiment presented in FIGS. 2-14, the user may also employ other means to match the in and out points of a selected timeline marker to corresponding in and out points on the timeline, thus aligning the selected timeline marker with a specific time interval on the timeline. For example, the user may activate either the "In" field digits shown inside the selected element in the "Marker List" panel, or the "In" field digits shown to the left of the "Set" button in the "Marker" panel, by selecting either of those fields using a mouse cursor, or other available means of selection. Having thus selected either the "In" field digits in the "Marker List" panel, or the "In" field digits in the "Marker" panel, the user may manually enter a desired time from the time range of the timeline. The user may then apply the entered time by activating the corresponding "Set" button shown in the "Marker" panel, or by pressing the "Enter" key on the keyboard. In response, the display of the selected timeline marker in the timeline marker region of the "Time View" panel may be adjusted to reflect the just-entered correspondences for the in and out points of the timeline marker. The change thus applied to the selected individual timeline marker may necessitate reflowing the display of timeline markers in the timeline marker region of the "Time View" panel, where the reflowing depends on positional relationships between the modified timeline marker and the other displayed timeline markers. In some instances, the modified timeline marker may remain, after modification, in the same track it occupied before the modification. In other instances, the modified timeline marker will be shifted into another track or layer following the modification. In either instance, the in and out points of the modified timeline marker may be adjusted to align with their corresponding in and out times on the timeline. In this and in other embodiments, a timeline marker may be modified by redefining its time interval by adjusting at least one of the in point and the out point of the timeline marker, thus designating at least one of a different starting point on the timeline and a different stopping point on the timeline. According to some embodiments, redefinition of a timeline marker's time interval may be achieved by dragging a handle that moves the in point and a dragging a handle that moves the out point.

Various other modifications to existing timeline markers may be made in the embodiment illustrated in FIGS. 2-14, and still other modification mechanisms may be offered in a variety of embodiments of the methods and systems presented herein. For example, the embodiment illustrated in FIGS. 2-14 permits a user to set or modify the type of a timeline marker. For instance, the type of the selected timeline marker labeled "Test Marker 0" may be modified by choosing a different type from the list of types contained in the "Type" drop-down menu shown at the top of the "Marker" panel in FIG. 14. A change in the type of a timeline marker may trigger a reflow of the display of timeline markers in the timeline marker region of the "Time View" panel in order to keep timeline markers of similar type grouped in neighboring tracks of the timeline marker region, or clustered in close proximity to each other in the timeline marker region. Numerous embodiments may allow other means for setting or resetting timeline marker types.

In addition to modifying existing timeline markers, embodiments of the methods and systems presented herein may permit existing timeline markers to be permanently deleted or to be temporarily suppressed from display within the timeline marker region. In the embodiment illustrated in FIGS. 2-14, a user may, for example, directly select a timeline marker displayed in a track in the timeline marker region of the "Time View" panel, or may select the timeline marker's representation in the "Marker List" panel, and subsequently delete the selected timeline marker by pressing the "Delete"

key on the keyboard or by any other means of signaling deletion of the selected timeline marker.

Various means may be presented in various embodiments for temporarily suppressing one or more existing timeline markers from display within the timeline marker region. For example, in the embodiment illustrated in FIGS. 2-14, a user may open the "Show" pull-down menu located above the timeline marker region of the "Time View" panel, or may alternatively open the "Show" pull-down menu at the top of the "Time View" panel, and then select one or more of the listed types. In response, user input component 140 of video application 100 may signal user interface component 150 or timeline marker management component 130 to limit the current display of timeline markers in the timeline marker region of the "Time View" panel to those timeline markers whose type matches one of the selected one or more timeline marker types. User interface component 150 and timeline management component 130 may then responsively suppress the display of all timeline markers whose type does not match one of the selected one or more listed timeline marker types. Different embodiments may offer various methods for selectively displaying timeline markers in portions or layers of the timeline marker region.

Both the aforementioned deleting of existing timeline markers and the suppression of existing timeline markers from the current display may trigger an automatic reflowing of the timeline markers designated for current display into the tracks, layers, rows, lanes, or other portions of the timeline marker region allotted for arranging the display of the timeline markers. As described above, modification of an individual currently-displayed timeline marker may also trigger an automatic reflow of the timeline markers. Further description of the flowing of timeline markers into portions of the timeline marker region is given below.

Components of video application 100, such as timeline marker management component 130, user input component 140, and user interface component 150 may operate collectively to provide various methods for the creation of new timeline markers, and addition of newly-created timeline markers to the collection of timeline markers being currently displayed in the timeline marker region. For example, in the embodiment illustrated in FIGS. 2-14, a user may invoke the "Marker Templates" panel shown directly below the "Marker List" panel to select a listed marker type and thereby initiate creation of a new timeline marker to be added to the collection of existing timeline markers. In the illustrated embodiment, the user may position the vertical timeline cursor to a desired "in" point or starting point somewhere along the timeline, and in response to selection of a timeline marker type from the list in the "Marker Templates" panel, user interface component 150 and timeline marker management component 130 may display a new timeline marker positioned in the timeline marker region with its "in" point, in this case the left endpoint of the timeline marker, coincident with the vertical timeline cursor, thus aligning the in point of the newly-created timeline marker with the time on the timeline to which the vertical timeline cursor points. After aligning the in point of the timeline marker with a time on the timeline, the user may then align the "out" point of the timeline marker with another timeline time, using any of various methods provided in the range of embodiments. Video application 100 may implement a variety of techniques for fixing both a type and a corresponding timeline time interval for a newly-created timeline marker.

Addition of a newly-created timeline marker to the collection of currently-displayed timeline markers may automatically actuate a reflowing mechanism of timeline management component 130 to present a space-efficient simultaneous visual rendering of all the timeline markers currently slated for display in the timeline marker region. Further description of the flowing of timeline markers into display tracks of the timeline marker region follows below.

Figure 2:
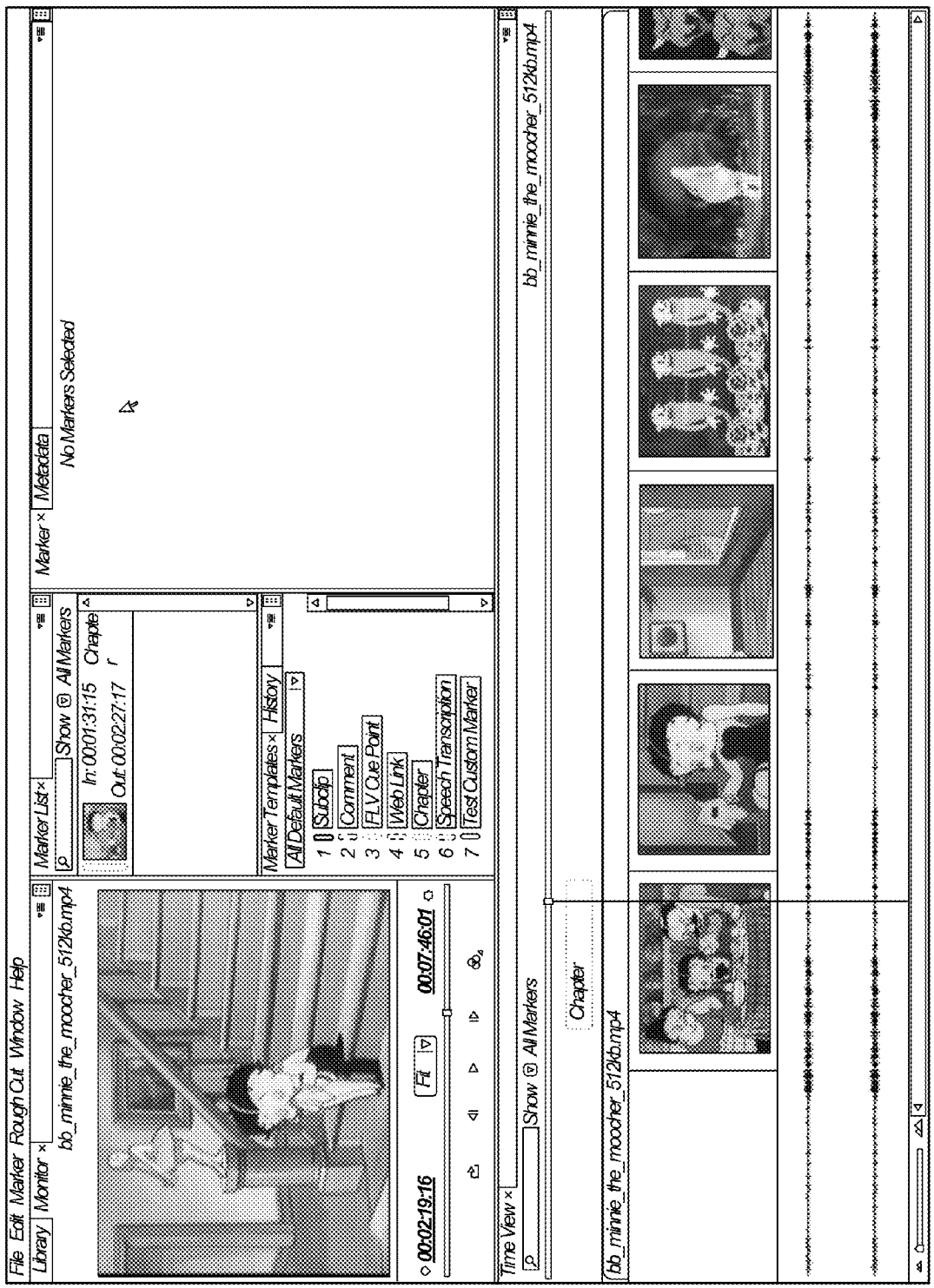
FIGS. 2-14 illustrate one embodiment of a user interface for a system that manages timeline markers simultaneously displayed within a timeline marker region of an interface for a video application.
Figure 3:
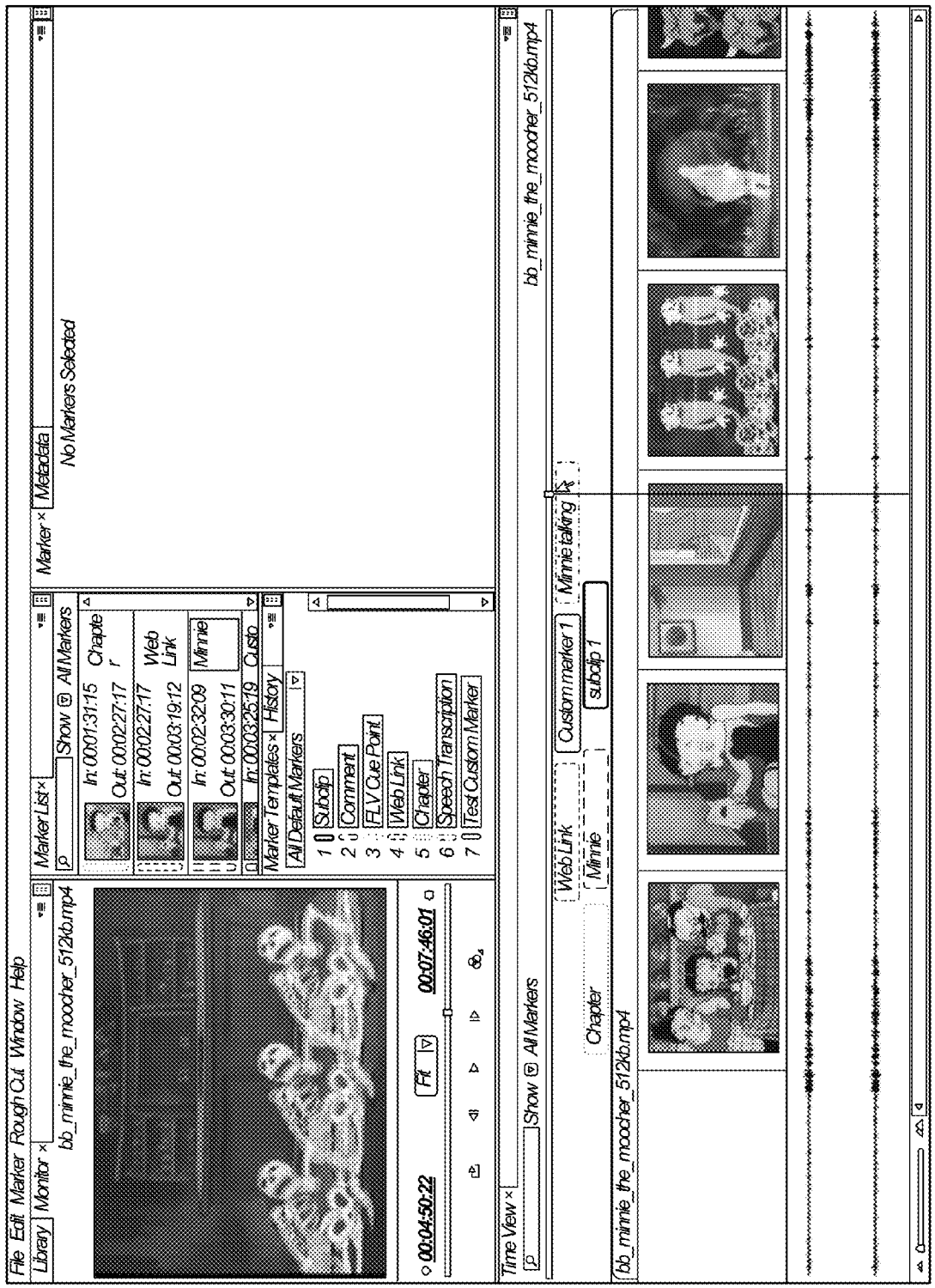

In general, modification and deletion of existing timeline markers, augmentation of currently-displayed timeline markers with newly-created timeline markers, suppression of existing timeline markers from the current display, and addition of existing timeline markers to a collection of currently-displayed timeline markers may all trigger an automatic reflowing of the timeline markers designated for current display into the tracks, layers, rows, lanes, levels, or other portions of the timeline marker region allotted for arranging the timeline markers designated for current display. These actions may also cause corresponding changes to other portions of the interface for video application 100. For example, changes to the collection of currently-displayed timeline markers may alter the list of timeline markers currently appearing in the "Marker List" panel illustrated in FIGS. 2-14. For instance, aligning the in point of one of the timeline markers shown in FIGS. 2-14 with a different time on the timeline may shift the corresponding element in the "Marker List" panel to a higher or lower position, based on a comparison of the times on the timeline with which the in points of the timeline markers are presently aligned. As another example, there is just one element in the "Marker List" panel shown in FIG. 2, which corresponds to the single timeline marker displayed below in the "Time View" panel. In contrast, FIG. 3 shows six timeline markers in the tracks above the timeline, and also shows six corresponding representations of those timeline markers in the "Marker List" panel.

Figure 8:
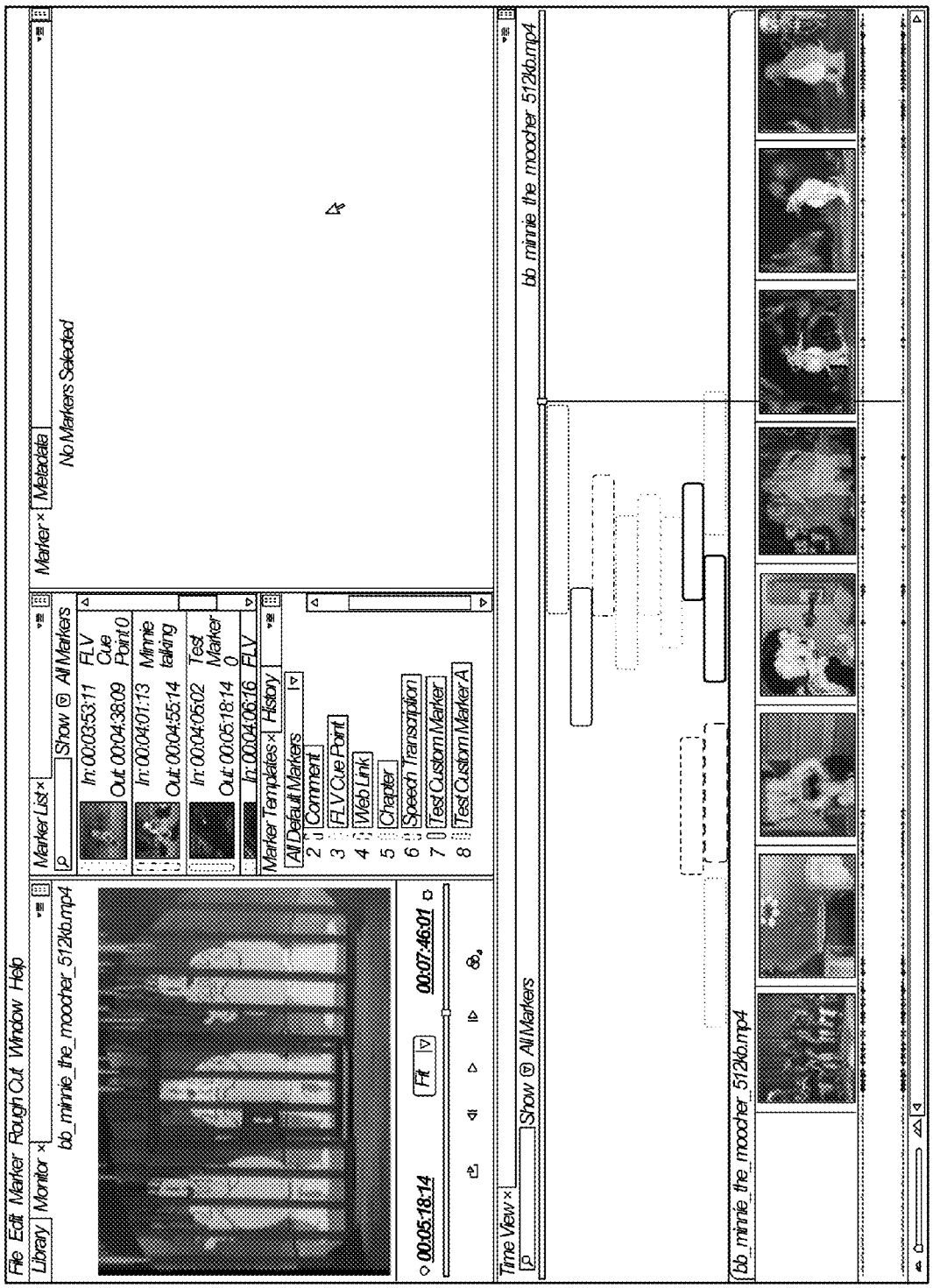
Figure 9:
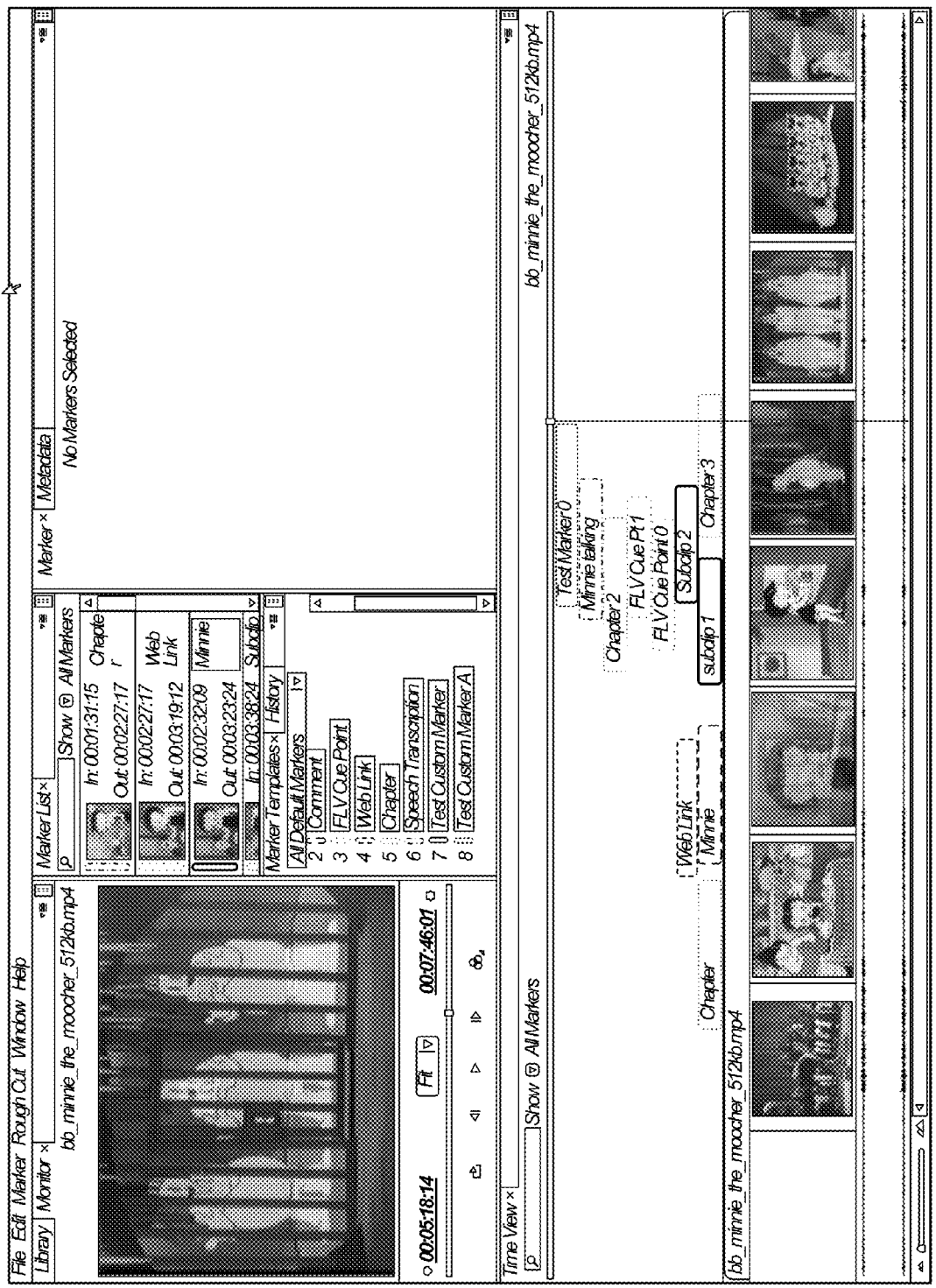

Timeline marker management component 130 and user interface component 150 of video application 100 may present a user interface in color, according to some embodiments. The black-and-white illustrations in FIGS. 2-14 actually represent a full-color embodiment of a user interface for video application 100. In particular, each of the timeline markers shown in FIGS. 2-14 is color-coded to indicate its type. For example, FIG. 9 shows eleven distinct timeline markers presented in seven display tracks of the timeline marker region of the "Time View" panel. The three timeline markers labeled "Chapter," "Chapter 2" and "Chapter 3" are all of the type "Chapter," a timeline marker type that appears in position 5 in the list of default markers in the "Marker Templates" panel. FIGS. 2-14 distinguish timeline markers of type "Chapter" by surrounding them with a border composed of very fine dots. The actual computer implementation represented by FIGS. 2-14 distinguishes timeline markers of type "Chapter" by coloring them red. In similar fashion, timeline markers of type "Subclip," "Comment," "FLV Cue Point," "Web Link," "Speech Transcription," "Test Custom Marker," and "Test Custom Marker A" are each distinguished in the actual embodiment by unique colors, and in the illustrations of FIGS. 2-14 by unique border patterns. Various embodiments may present diverse means for distinguishing markers of differing types, including numerous color schemes for designating the various types of timeline markers. In the embodiment illustrated in FIGS. 2-14, timeline markers of type "FLV Cue Point" are used for marking and managing flash video navigation points.

The user interface illustrated in FIGS. 2-14 represents one embodiment of a user interface for a video application 100 implementing the methods and systems described herein. Many other embodiments of user interfaces for video application 100 are feasible. The placement and composition of various panels of an interface for video application 100 may vary from one embodiment to another. In fact, the particular embodiment illustrated in FIGS. 2-14 permits rearrangement of the various panels of the user interface, and also allows addition of new panels to the current display, as well as removal of existing panels from current display. Various embodiments, including the one illustrated in FIGS. 2-14, may also be configured to expand the collection of available timeline markers to include new types of timeline markers.

Figure 15:
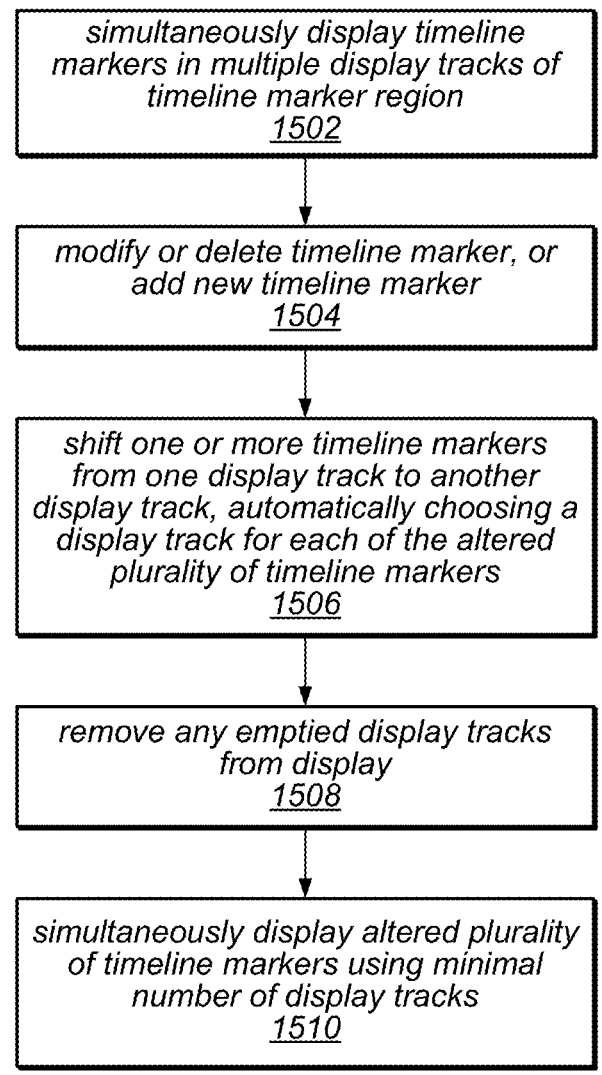
FIG. 15 is a flow diagram illustrating one embodiment of timeline marker management actions.

FIG. 15 illustrates, in broad outline, various actions performed in executing the techniques described above.

The automated dynamic flowing and reflowing of timeline markers into various display tracks of a timeline marker region may be triggered by numerous actions already described in the foregoing paragraphs. In response to such actions, and based on signals received at user input component 140, timeline marker management component 130 and user interface component 150 may operate to automatically position or reposition timeline markers slated for current display into tracks, layers, rows, lanes, paths, levels, a matrix, or any other positional framework of the timeline marker region that is allotted for arranging the timeline markers. The automatic flowing and reflowing of timeline markers into display tracks of the timeline marker region may be performed, in diverse embodiments, according to a set of rules that may be based either on heuristics or on algorithmic techniques, or on both. The set of positioning rules may include topological methods for arranging, packing, fitting, stacking, and compacting the timeline markers within a malleable positional framework for displaying timeline markers in proximity to a timeline. These methods conserve space within the interface while maintaining clarity and functionality of the displayed timeline markers.

FIGS. 2-14 show a series of snapshots taken during a phase of logging video footage using timeline markers. In FIG. 2, there is just a single timeline marker, of type "Chapter," the fifth type listed in the "Marker Templates" panel above the "Time View" panel. The name of this timeline marker is also "Chapter." The lone timeline marker labeled "Chapter" corresponds to a definite time interval of the video presentation represented on the timeline below.

In progressing from FIG. 2 to FIG. 3, five more timeline markers are positioned in two tracks of the timeline marker region. The six timeline markers that appear in two rows above the timeline comprise six distinct types, each color-coded with its own unique color, as represented in the illustration of FIG. 3 by the six different border patterns. The timeline markers are positioned in the timeline marker region, according to the set of positioning rules described above, so that a minimal number of tracks is used, and so that no empty tracks appear between non-empty tracks. In this instance, the minimal number of tracks is two, because some of the timeline markers coincide with overlapping time intervals on the timeline. In progressing from FIG. 2 to FIG. 3, five more members are also added to the "Marker List" panel, one for each of the five additional timeline markers shown adjacent the timeline.

FIG. 3 thus presents a simultaneous display of multiple timeline markers within multiple display tracks of a timeline marker region of an interface for a video application, providing an illustrative embodiment of step 1502 of FIG. 15. Each of the plurality of timeline markers appears in one of the multiple display tracks, such that the plurality of timeline markers are separate from each other. The in point of each of the plurality of timeline markers currently on display is aligned with a designated starting point on the timeline, and the out point of each of the plurality of timeline markers is aligned with a designated stopping point on the timeline. In the embodiment illustrated in FIG. 3, the in point of each timeline marker is its left endpoint, and the out point of each timeline marker is its right endpoint. In some other embodiments, the in and out points may be offset from the endpoints. For example, a separate drag handle may occupy a small portion of each end of the timeline markers, and the in and out points may be fixed just adjacent to the drag handles.

No empty display track appears between two display tracks that each contain one or more of the plurality of timeline markers. Each of the six timeline markers simultaneously displayed adjacent the timeline in FIG. 3 is automatically positioned in one of the multiple display tracks according to the set of rules for automatically placing timeline markers within the multiple display tracks so that they are simultaneously visible. This automatic positioning comprises, for each of the timeline markers to be positioned, automatically choosing one of the multiple display tracks in which to display the timeline marker. The automatic positioning also automatically optimizes use of space in the timeline marker region by minimizing the number of display tracks used in positioning the timeline markers. The automatic positioning of timeline markers illustrated in FIG. 3 places different types of timeline markers within a single display track. The lower display track contains timeline markers of three different types, namely "Chapter," "Comment," and "Subclip," as listed at positions 5, 2, and 1 in the list of timeline marker types shown in the "Marker Templates" panel above the "Time View" panel. The upper display track also contains timeline markers of three different types, namely "Web Link," "Test Custom Marker," and "Speech Transcription," as listed at positions 4, 7, and 6 in the list of timeline marker types shown in the "Marker Templates" panel above the "Time View" panel.

Figure 4:
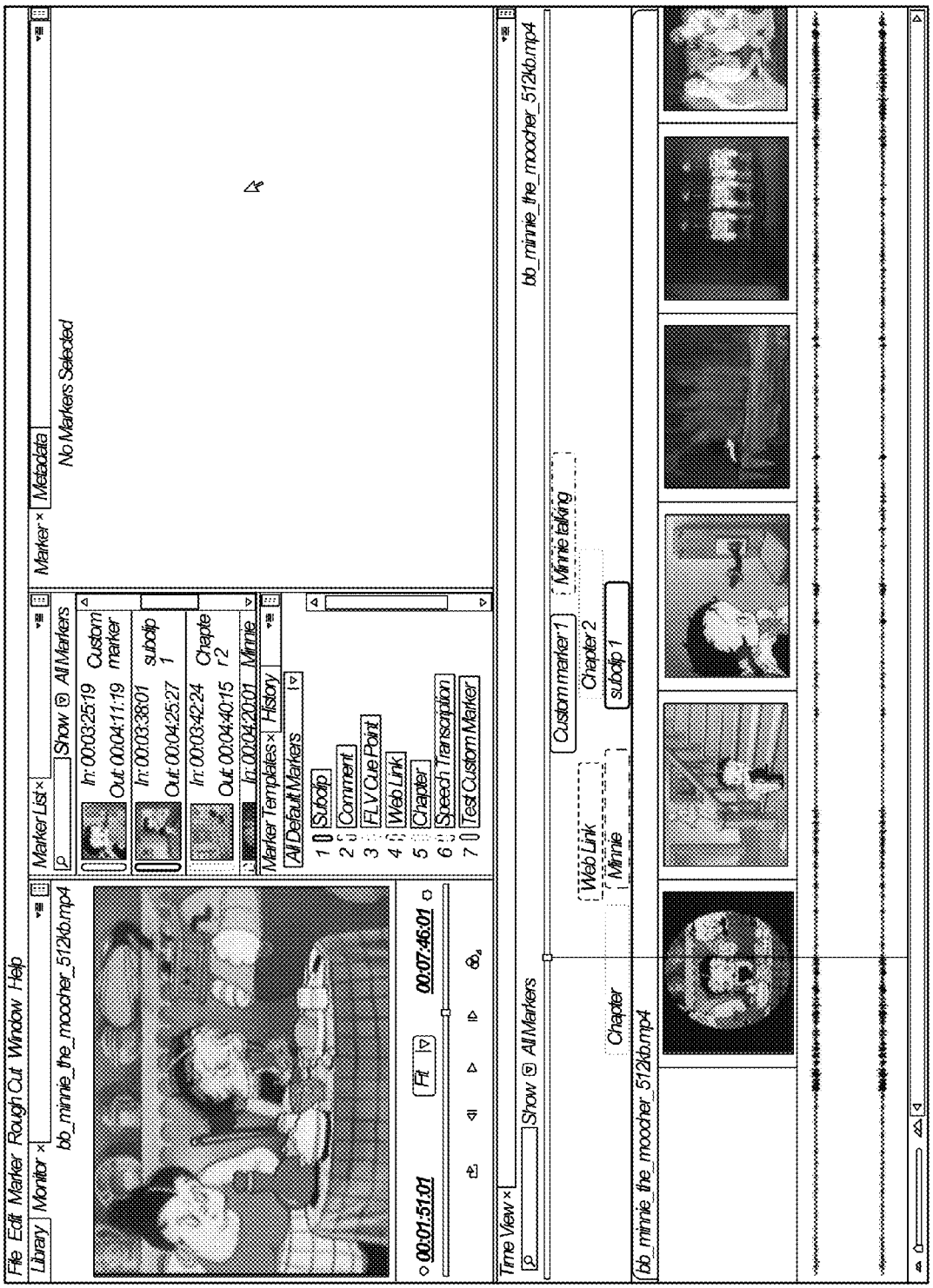

The progression from FIG. 3 to FIG. 4 includes addition of another timeline marker of type "Chapter" to the collection of six timeline markers shown currently displayed in FIG. 3. The added timeline marker is named "Chapter 2," as shown in FIG. 4. Since the new timeline marker overlaps the time intervals of both of the existing timeline markers named "Custom Marker 1" and "subclip 1," timeline marker management component 130 may determine, based on the set of positioning rules for automated positioning of timeline markers, that the new timeline marker cannot be put in the same display track with either of the existing timeline markers labeled "Custom Marker 1" and "subclip 1" without overlapping one of those existing timeline markers. Timeline marker management component 130 may therefore cooperate with user interface component 150 of video application 100 to expand the timeline marker region to include a third display track, thus permitting simultaneous display of all seven timeline markers, with each of the seven timeline markers appearing distinct or separate from each of the other timeline markers. This expansion of the timeline marker region increases the depth of the timeline marker region to accommodate the added third display track. Addition of the seventh timeline marker to the collection of six timeline markers shown in FIG. 3 triggers an automatic reflowing, into the three display tracks of the timeline marker region, of the timeline markers designated for current display, namely the six existing timeline markers and the added timeline marker labeled "Chapter 2." Timeline marker management component 130 manages the automatic reflowing according to the set of positioning rules for automated positioning of timeline markers, which may be based either on heuristics or on algorithmic techniques, or on both. The set of positioning rules may include topological methods for arranging, packing, fitting, stacking, and compacting the timeline markers within the malleable positional framework comprising the tracks of the timeline marker region. The additional timeline marker labeled "Chapter 2" is placed into a track separate from the tracks containing the timeline markers "Custom Marker 1" and "subclip 1." The reflowing puts the "Web Link" timeline marker into the same display track as the timeline marker labeled "Chapter 2," rather than the display track containing the timeline markers "Custom Marker 1" and "Minnie talking," because a particular set of positioning rules embodied in FIGS. 2-14 may attempt to arrange timeline markers with earlier "in" points into lower display tracks. Other embodiments of positioning rules may or may not include this feature. The expansion of the timeline marker region causes a corresponding vertical contraction of the timeline itself in order to maintain the overall dimensions of the "Time View" panel. The arrangement of the seven timeline markers shown in FIG. 4 optimizes the use of space within the timeline marker region itself by minimizing the number display tracks occupied by timeline markers. There are no empty display tracks.

Figure 5:
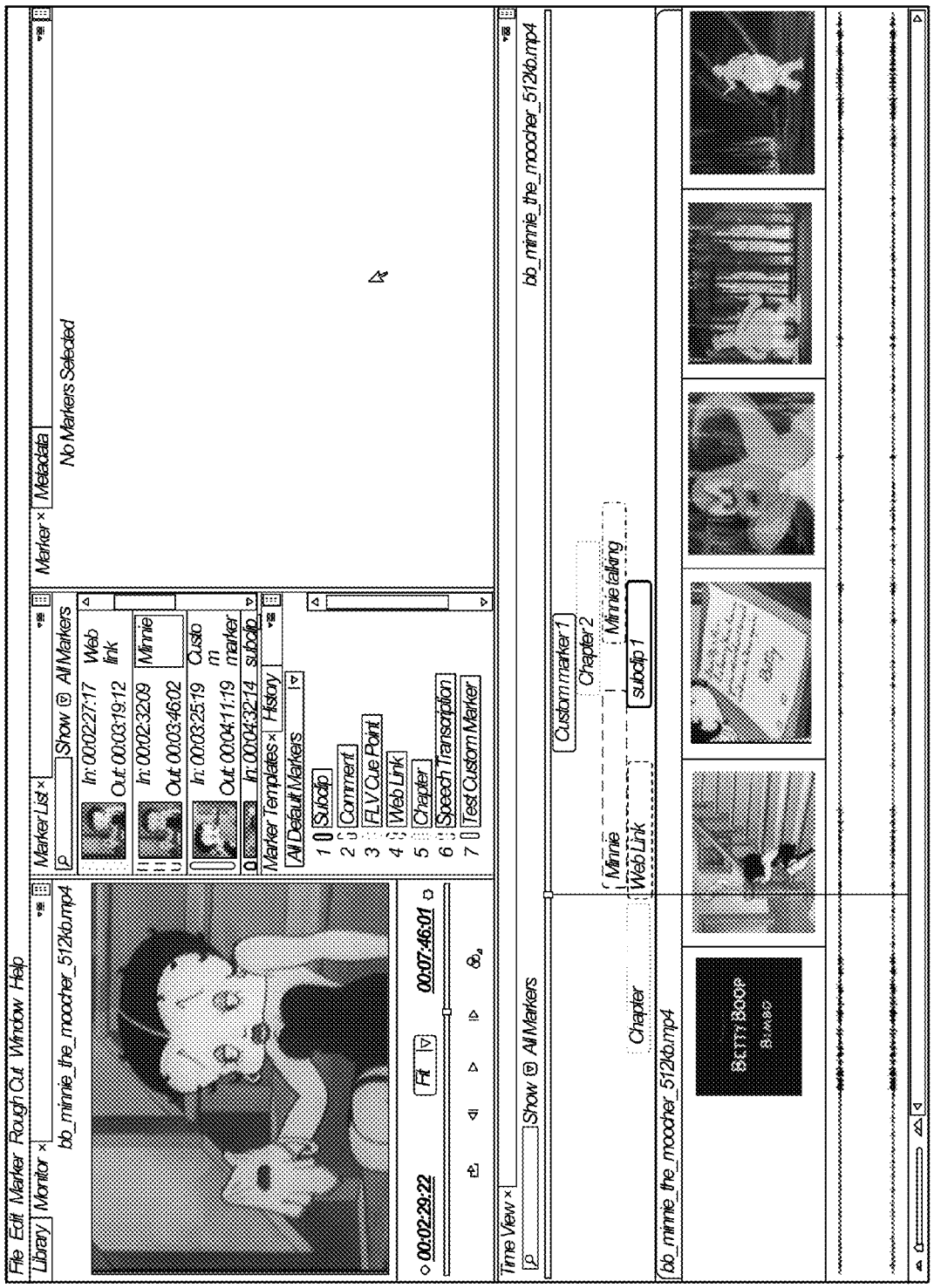

The transition from FIG. 4 to FIG. 5 does not involve adding any new timeline markers to the collection currently displayed in FIG. 4, nor does it involve the deletion of any of the existing timeline markers shown in FIG. 4. Instead, the existing seven timeline markers shown in FIG. 4 are reflowed into display tracks of the timeline marker region of the "Time View" panel in response to a modification made to the timeline marker labeled "Minnie," which is a timeline marker whose type is "Comment." The timeline marker labeled "Minnie" is modified from its state shown in FIG. 4 by resetting the correspondence between its "out" point and the timeline below. The "out" point of the timeline marker labeled "Minnie" is set to a later time on the timeline, that is, fixed to align with a point further to the right on the timeline. This modification of the timeline marker labeled "Minnie" redefines and lengthens its time interval by adjusting its "out" point to a different point on the timeline. As a consequence, the newly-defined time interval for the timeline marker labeled "Minnie" intersects the time interval for the timeline marker labeled "subclip 1." The newly-defined time interval also intersects the two timeline time intervals defined by the "Custom marker 1" timeline marker and the "Chapter 2" timeline marker. Timeline marker management component 130 may therefore determine, based on the set of rules for the positioning of timeline markers, that the modified, extended version of the "Minnie" timeline marker cannot be put in the same display track with any of the three other timeline markers labeled "subclip 1," "Custom marker 1," and "Chapter 2" without overlapping one of them. This causes timeline marker management component 130 and user interface component 150 to expand the timeline marker region again, by adding a fourth display track, in order to accommodate the simultaneous display of all seven of the timeline markers, such that each appears distinct and separate from the other six timeline markers. The depth of the timeline marker region may again be increased to accommodate the added fourth display track. In alternative embodiments, the depth of the timeline marker region may not increase, but the multiple display tracks designated to currently display a timeline marker may be simultaneously fit into the timeline marker region by decreasing the thickness of some or all of the multiple display tracks. In either event, the overall dimensions of the "Time View" panel may be maintained. In yet other embodiments, the "Time View" panel may itself be expanded to accommodate additional display tracks in the timeline marker region.

This modification of the "Minnie" timeline marker triggers a reflowing, into the four tracks of the timeline marker region, of the seven existing timeline markers. The reflowing may occur automatically, in response to the modification of the timeline marker labeled "Minnie," or may require, according to some embodiments, user activation of the reflowing mechanism. As discussed previously, the reflowing of the timeline markers is managed by timeline marker management component 130 according to a set of positioning rules that include heuristics or strict algorithmic techniques, or both. The positioning rules may include topological methods for arranging, shifting, packing, fitting, stacking, and compacting the timeline markers within the malleable positional framework comprising the tracks of the timeline marker region. The set of positioning rules may be fixed in a particular embodiment, but changeable or modifiable in another embodiments. The set of positioning rules used by video application 100 may also vary from one embodiment to another.

The modification of the "Minnie" timeline marker shown in FIG. 4 movies it out of the display track occupied by the "subclip 1" marker and into a display track not that does not contain either of the timeline markers labeled "Custom marker 1" and "Chapter 2." Shifting the "Minnie" timeline marker out of the lowest track shown in FIG. 4 leaves a gap between the timeline markers labeled "Chapter" and "subclip 1," and timeline marker management component 130 may shift the timeline marker labeled "Web Link" downward into this gap, based on a condition in the set of positioning rules that drops timeline markers down to fill available gaps during the reflowing process. Various embodiments of the set of positioning rules may or may not include this condition. For example, an alternative embodiment may push timeline markers upward to fill available gaps in timeline marker display tracks. For such an alternative embodiment, the timeline marker labeled "Web Link" may move up into the same display track as timeline marker "Custom marker 1" or into the same display track as timeline marker "Chapter 2." The arrangement of the seven timeline markers shown in FIG. 5 optimizes the use of space within the timeline marker region itself by minimizing the number display tracks occupied by timeline markers. There are no empty display tracks.

Figure 6:
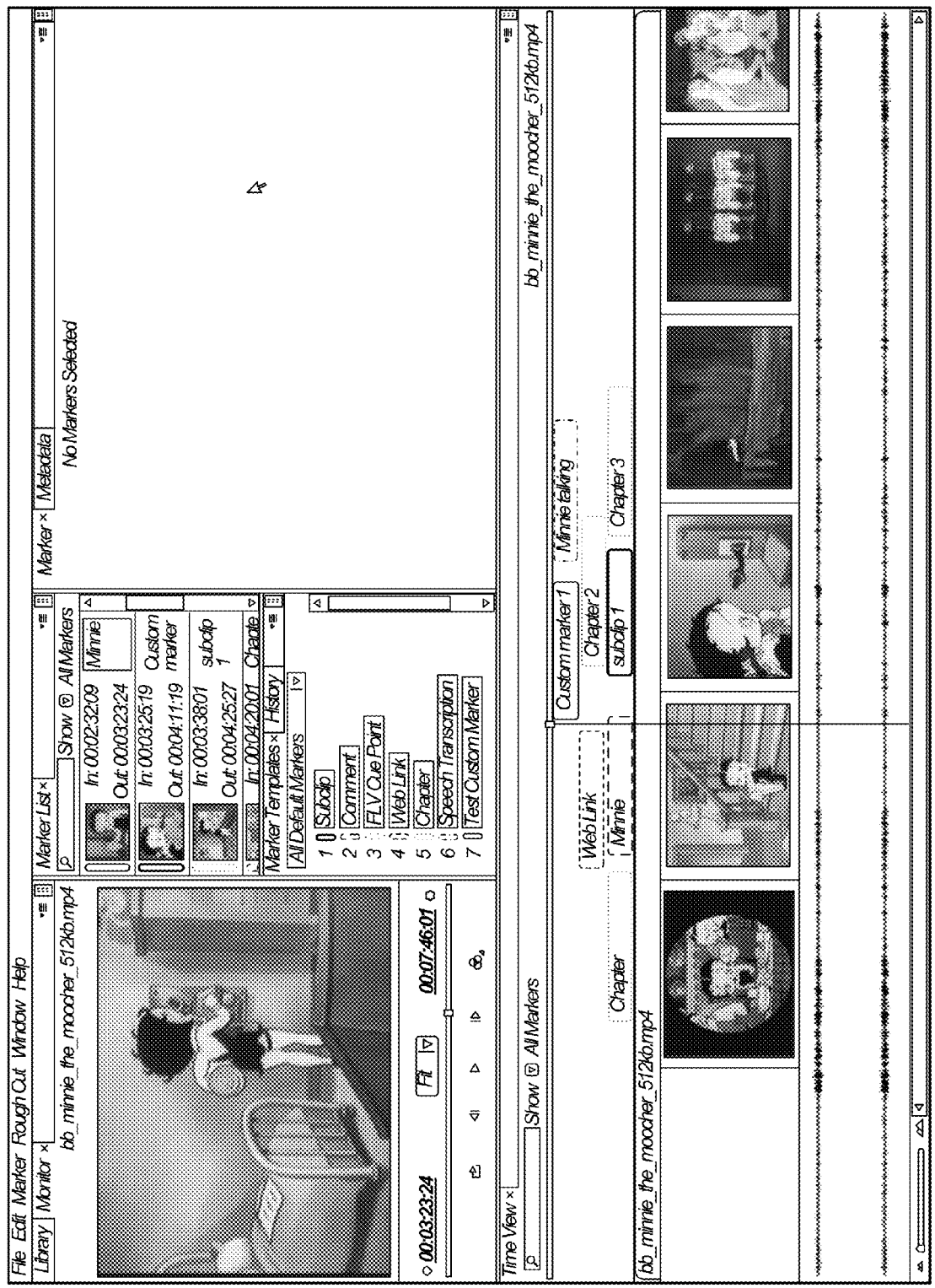

The transition from FIG. 5 to FIG. 6 includes both addition of a new timeline marker to the collection currently displayed in FIG. 5, and another modification to the existing timeline marker labeled "Minnie." In response to these changes, all eight timeline markers are reflowed into just three display tracks of the timeline marker region of the "Time View" panel. The timeline marker labeled "Minnie" is modified from its state shown in FIG. 5 by resetting the correspondence between its "out" point and the timeline below. The "out" point of the timeline marker labeled "Minnie" is set to an earlier time on the timeline, that is, fixed to align with a point further to the left on the timeline. This modification of the timeline marker labeled "Minnie" redefines and shortens its time interval by adjusting its "out" point to a different point on the timeline. As a consequence, the newly-defined time interval for the timeline marker labeled "Minnie" no longer intersects the time interval for the timeline marker labeled "subclip 1," and corresponds to a timeline time interval that fits between the time interval for the timeline marker labeled "Chapter" and the time interval for the timeline marker labeled "subclip 1." Timeline marker management component 130 may therefore determine, based on the set of rules for the positioning of timeline markers, that the modified, shortened version of the "Minnie" timeline marker should be placed into the lowest display track between the timeline marker labeled "Chapter" and the timeline marker labeled "subclip 1," displacing the "Web Link" timeline marker upward one level. This exchange of display tracks by the two timeline markers may be based on a condition in the set of positioning rules that favors placing timeline markers of type "Comment" into lower display tracks than timeline markers of type "Web Link," when possible. An alternative embodiment of the set of positioning rules may reverse this ordering, leaving the "Minnie" timeline marker above the "Web Link" timeline marker. Yet other embodiments may determine whether to switch the levels of two timeline markers based on a different condition.

The shortening of the "Minnie" timeline marker makes it feasible for any one of the three timeline markers labeled "Minnie talking," "Custom marker 1," and "Chapter 2" to be positioned on the second-lowest of the timeline display tracks. Timeline marker management component 130 and user interface component 150 may thus determine, based on a particular embodiment of the set of positioning rules, to place the "Chapter 2" timeline marker on the second-lowest of the timeline display tracks, which is adjacent to the display track containing the "Chapter" timeline marker. Such a determination may derive from a rule that favors grouping together display tracks containing timeline markers of the same type. The arrangement shown in FIG. 6 groups all of the timeline markers of type "Chapter" into adjacent tracks. This arrangement shifts the "Chapter 2" marker and the "Custom marker 1" marker down one level, shifts the "Minnie talking" timeline marker up one level, and requires only three display tracks to simultaneously display all eight of the timeline markers. As a result, the timeline marker region may contract, and the combined depth of the eight timeline markers may decrease. The space freed by contracting the timeline marker region may be reclaimed in various ways, according to various embodiments. For example, the "Time View" panel may preserve its previous dimensions while its timeline is expanded. Alternatively, the "Time View" panel may shrink, and one or more other components of the interface may occupy a portion of the space previously taken by the "Time View" panel. The arrangement of the eight timeline markers shown in FIG. 6 optimizes the use of space within the timeline marker region itself by minimizing the number display tracks occupied by timeline markers. There are no empty display tracks.

Figure 7:
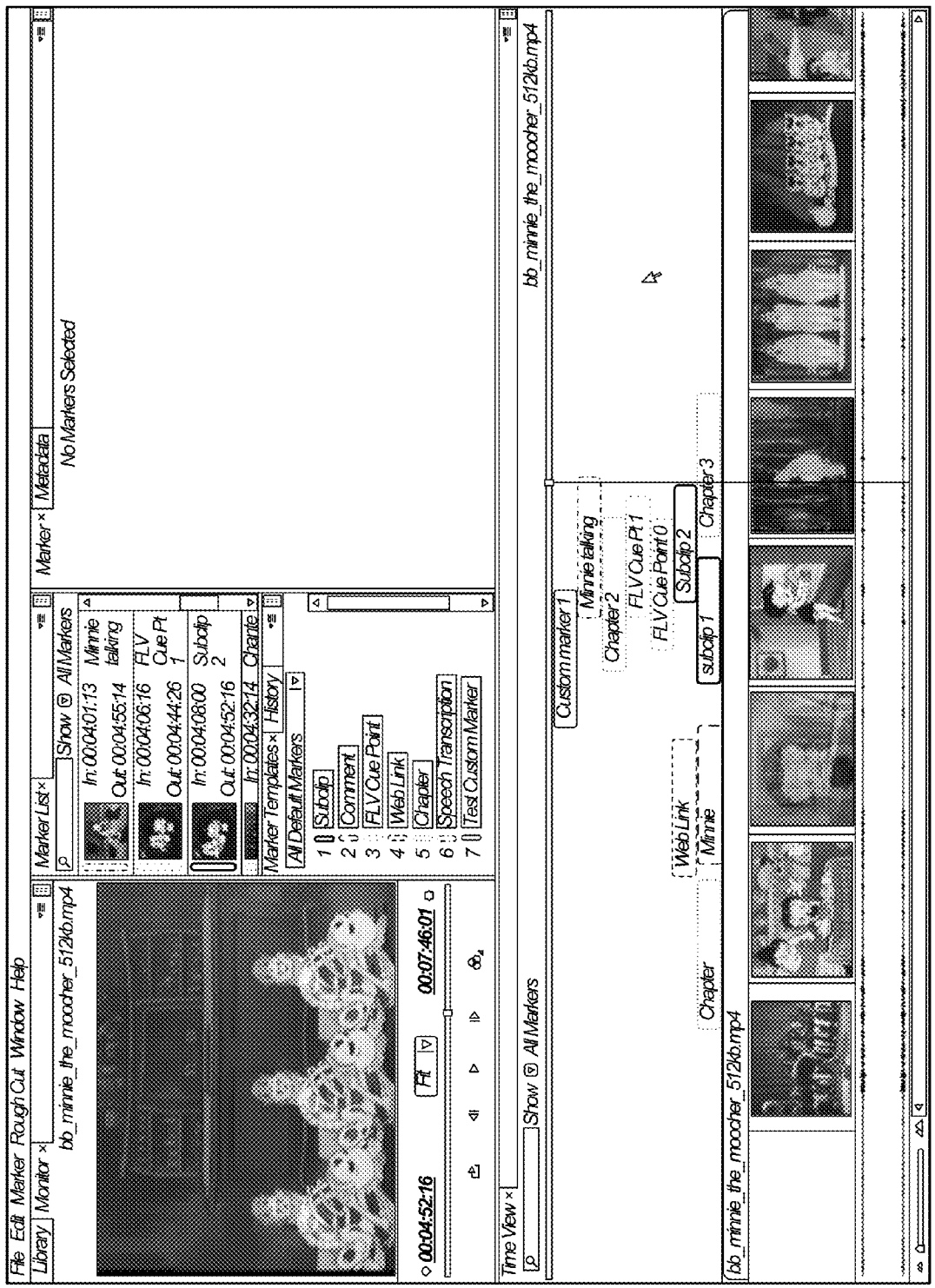

The progression from FIG. 6 to FIG. 7 includes the addition of three new timeline markers labeled "Subclip 2," "FLV Cue Point 0," and "FLV Cue Pt 1," and results in the expansion of the timeline marker region to include seven parallel display tracks. The previous dimensions of the "Time View" panel are maintained by contracting both the video thumbnail images and the audio tracks of the timeline itself. According to other embodiments, the "Time View" panel may expand to accommodate the addition of more display tracks in the timeline marker region. In yet other embodiments, the thickness of one or more of the display tracks may also be adjusted to compensate for the addition of extra display tracks in the timeline marker region.

For the embodiment illustrated in FIG. 7, the set of rules for positioning timeline markers within the timeline marker region may include a weighting factor that favors placing timeline markers having a higher position, in an ordering of timeline marker types, into higher tracks of the timeline marker region, while at same time attempting to group timeline markers of the same type into the same or adjacent display tracks. The "Marker Templates" panel displays an ordering of timeline marker types, as shown in FIG. 7 and FIG. 8, such that type "Subclip" is given position 1 in the ordering, type "Comment" is assigned position 2, type "FLV Cue Point" is at position 3, type "Web Link" is at position 4, type "Chapter" is at position 5, type "Speech Transcription" is at position 6, type "Test Custom Marker" is at position 7, and type "Test Custom Marker A" is at position 8. Consequently, for this particular embodiment of the set of positioning rules, the timeline markers are distributed across the display tracks as illustrated in FIG. 7. Other embodiments of a set of positioning rules for timeline markers may or may not include a weighting factor that favors placing timeline markers having a higher position, in an ordering of timeline marker types, into higher tracks of the timeline marker region. The positioning rules for timeline markers may vary from one embodiment to another.

The progression from FIG. 7 to FIG. 8 involves the addition of a marker of type "Test Custom Marker A," and the addition of an eighth display track to accommodate the new timeline marker, which is positioned in the top display track of FIG. 8. In response to an interface usability or legibility criterion for the embodiment illustrated in FIG. 8, timeline marker management component 130 and user interface component 150 may adapt the height of the display tracks and the timeline markers so that they are thinner in order to lessen the combined thickness or depth of the display tracks. For the embodiment shown in FIG. 8, and based on having crossed a threshold requiring a minimum thickness of timeline markers to accommodate the display of text within the timeline markers, timeline marker management component 130 and user interface component 150 may display the timeline markers without any text, as shown in FIG. 8. Addition of more display tracks may result in further thinning of the timeline markers so that they can all be displayed in the timeline marker region while controlling the depth of the timeline marker region itself. According to some embodiments, thresholds and other settings governing the display of the timeline markers may be modifiable by the user.

For certain embodiments, current display of the timeline markers may be based upon a chosen interval of time for the timeline. For example, timeline markers outside a particular time interval may not be included in the current display.

The progression from FIG. 8 to FIG. 9 involves deletion of the single timeline marker that appears in the second display track from the top of the timeline marker region in FIG. 8, namely the marker of type "Test Custom Marker." In response to this deletion, the display track that formerly contained that timeline marker is removed from the current display, and text is once again displayed in each of the timeline markers, based on having again met the threshold requirement for a minimum thickness of timeline markers in order to accommodate the display of text within the timeline markers.

Figure 10:
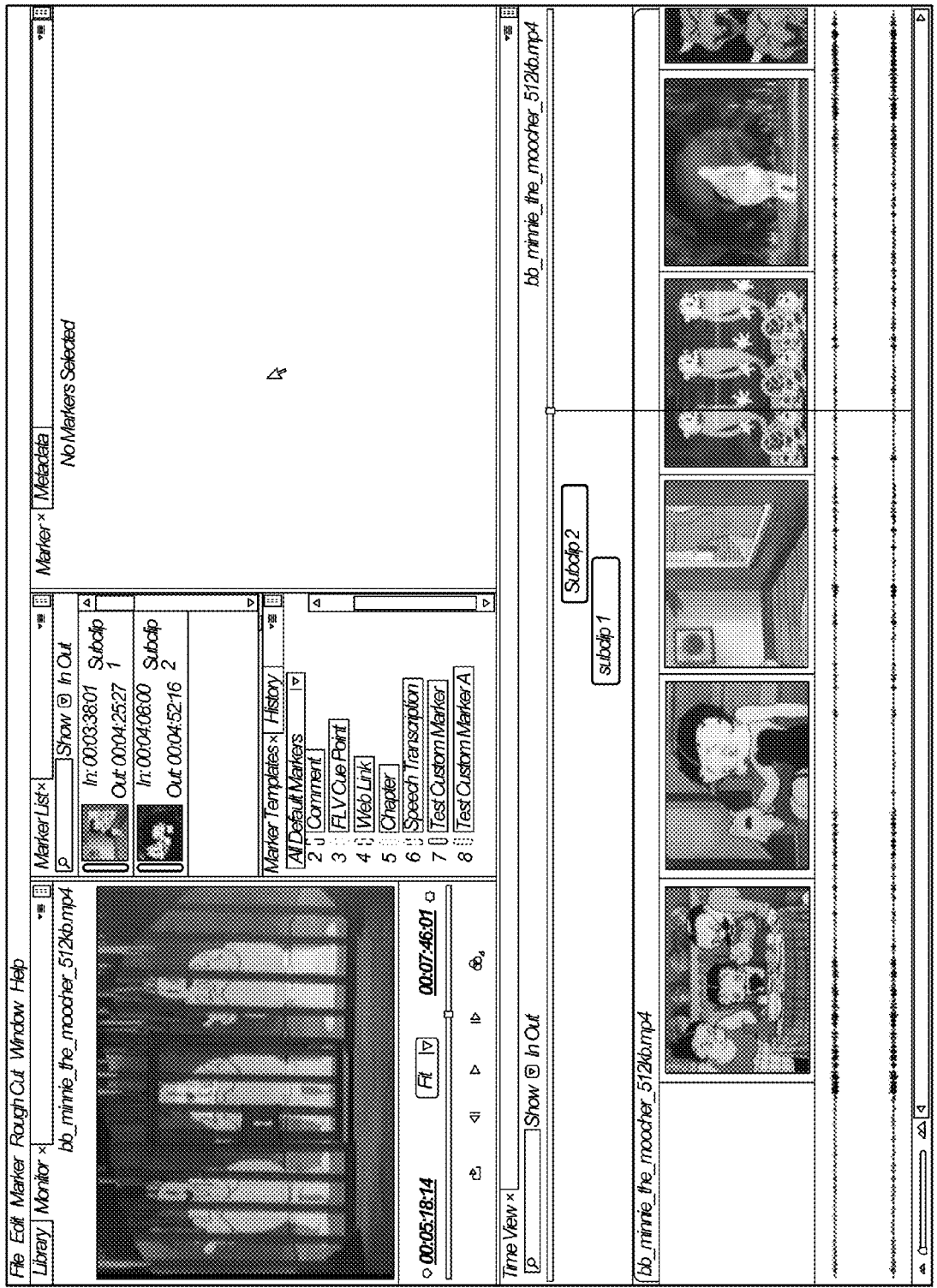

FIG. 10 illustrates an alteration of the display of timeline markers shown in FIG. 9 in the timeline marker region, based on matching the plurality of timeline markers shown in FIG. 9 against a filtering criterion to select a subset of the plurality of timeline markers. In the embodiment illustrated in FIG. 10, the "Show" menu choice that appears in the upper left-hand portion of the "Time View" panel and at the top of the "Marker List" panel has been changed from "All Markers," as pictured in FIG. 9, to "InOut," as pictured in FIG. 10. Choosing "InOut," instead of "All Markers," filters all timeline markers except those of type "Subclip" from active display. In response to the selection of only markers of type "Subclip," as indicated by choosing the "InOut" option, timeline marker management component 130 and user interface component 150 display only the selected subset of timeline markers, namely markers of type "Subclip," so that no empty display track appears between two display tracks that each contain one or more of the selected subset of timeline markers. In the embodiment illustrated in FIG. 10, there are no empty display tracks.

Figure 11:
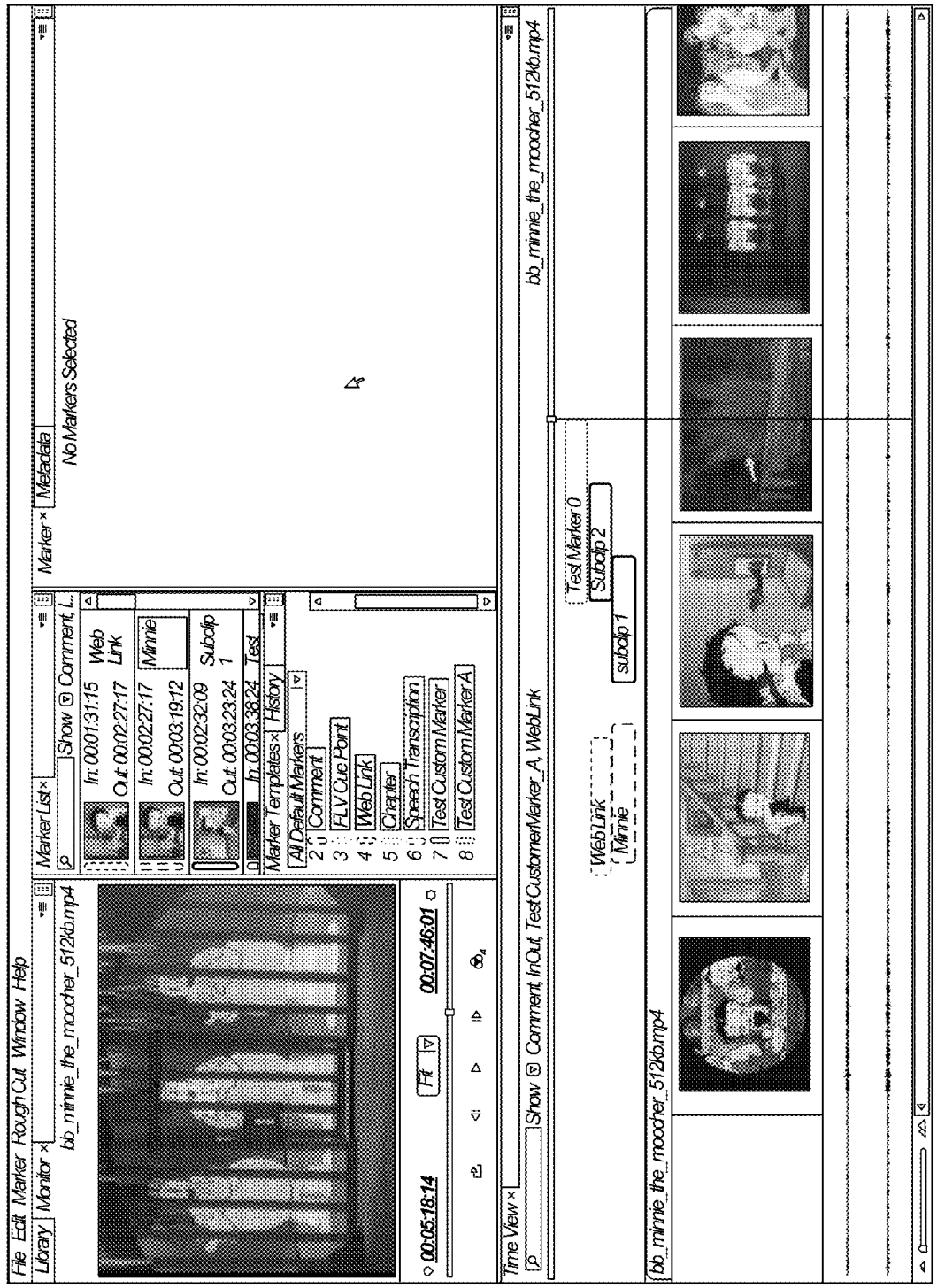

FIG. 11 illustrates an alteration of the display of timeline markers shown in FIG. 10 in the timeline marker region, based on matching all of the existing timeline markers against another filtering criterion to select a subset of the set of all existing timeline markers. In the embodiment illustrated in FIG. 11, the "Show" menu choice that appears in the upper left-hand portion of the "Time View" panel and at the top of the "Marker List" panel has been changed from "InOut," as pictured in FIG. 10, to "Comment, InOut, TestCustomMarker_A, WebLink" as pictured in FIG. 11. This choice allows only timeline markers of type "Comment," "Subclip," "Test Custom Marker A," and "Web Link" in the current display, as shown in FIG. 11. In the embodiment illustrated in FIG. 10, there are no empty display tracks. Based on a comparison between the particular set of timeline markers selected for current display and the set of timeline markers which was previously displayed, timeline marker management component 130 and user interface component 150 may shift one or more of the timeline markers selected for current display from one of the multiple display tracks in which it was previously displayed into another display track.

Figure 12:
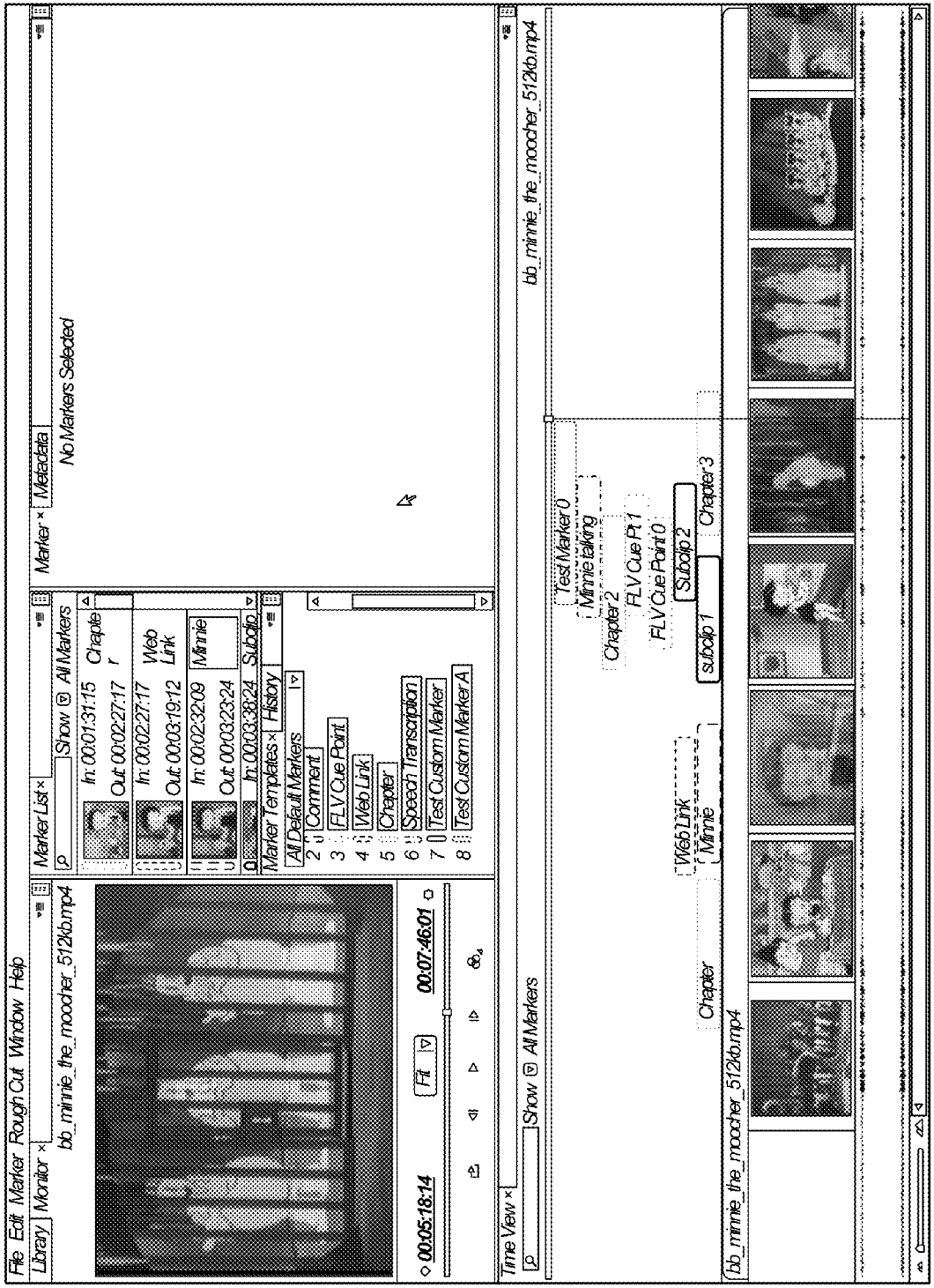

FIG. 12 illustrates a return to displaying all of the existing time marker simultaneously, just as they were displayed in FIG. 9.

Figure 13:
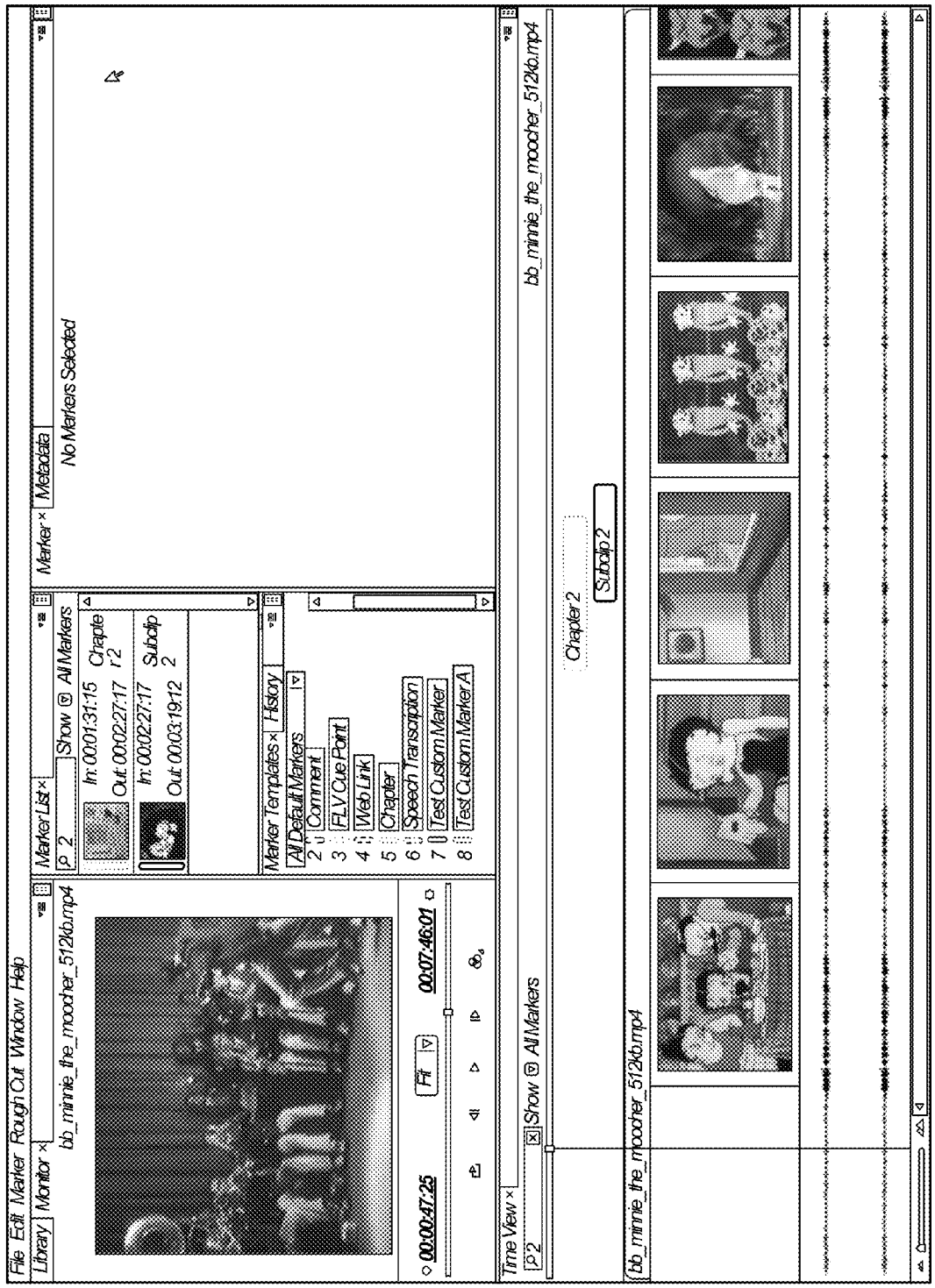

The progression from FIG. 12 to FIG. 13 illustrates an alteration of the display of timeline markers shown in FIG. 12, based on matching the plurality of timeline markers shown in FIG. 12 against another filtering criterion to select a subset of the plurality of timeline markers. In this instance, the filtering criterion is detected by user input component 140 as the digit "2," which is entered by a user into the filtering box at the upper left-hand corner of the "Time View" panel. In response, a subset of the plurality of timeline markers shown in FIG. 12 is selected for current display, namely the timeline markers whose labels contain a matching digit 2, that is, the timeline markers labeled "Chapter 2" and "Subclip 2." In response, timeline marker management component 130 and user interface component 150 display only those two timeline markers, as shown in FIG. 13. No empty display tracks are permitted, and the timeline marker region shrinks, while the timeline itself is allowed to expand.

The illustration shown in FIG. 14 is very similar to the one shown in FIG. 9, except that the timeline marker labeled "Test Marker 0" has been selected, as indicated by the dotted borderline that surrounds and distinguishes the member of the "Marker List" panel that represents the timeline marker labeled "Test Marker 0" in the timeline marker region of the "Time View" panel below. Selection of a particular timeline marker may be signaled to user input component 140 either by user activation of the corresponding interactive element in the list of existing timeline markers shown in the "Marker List" panel, or by user activation of the timeline marker itself in the "Time View" panel, or by any other suitable means of activation, according to various embodiments. In response to this selection, timeline marker management component 130 and user interface component 150 may automatically highlight or otherwise distinguish both the timeline marker in the "Time View" panel and its corresponding member in the "Marker List" panel, and may also trigger automatic display, within the "Marker" panel, of one or more of data entry fields, informational data, and controls for the selected individual timeline marker. In the embodiment illustrated in FIG. 14, "Test Marker 0" is selected, and a corresponding template is displayed inside the "Marker" panel. In FIG. 14, the vertical timeline cursor is further to the left than it is in FIG. 9.

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods for simultaneously displaying a plurality of timeline markers within a timeline marker region of an interface for a video application, as described in the foregoing paragraphs. In particular, video application 100 and any partition of its constituent components illustrated in FIG. 1, or any other such components as may be implemented in various embodiments to perform the methods and techniques described above, may be implemented as such instructions. Such instructions may be executed to perform a particular computational function, such as generating, sending, or receiving a message, to implement mathematical functions such as integration, differentiation, convolution, etc., as well as to implement higher-order functions such as operating system functioning, network communications functioning, application functioning, and/or any other suitable functions.

Figure 16:
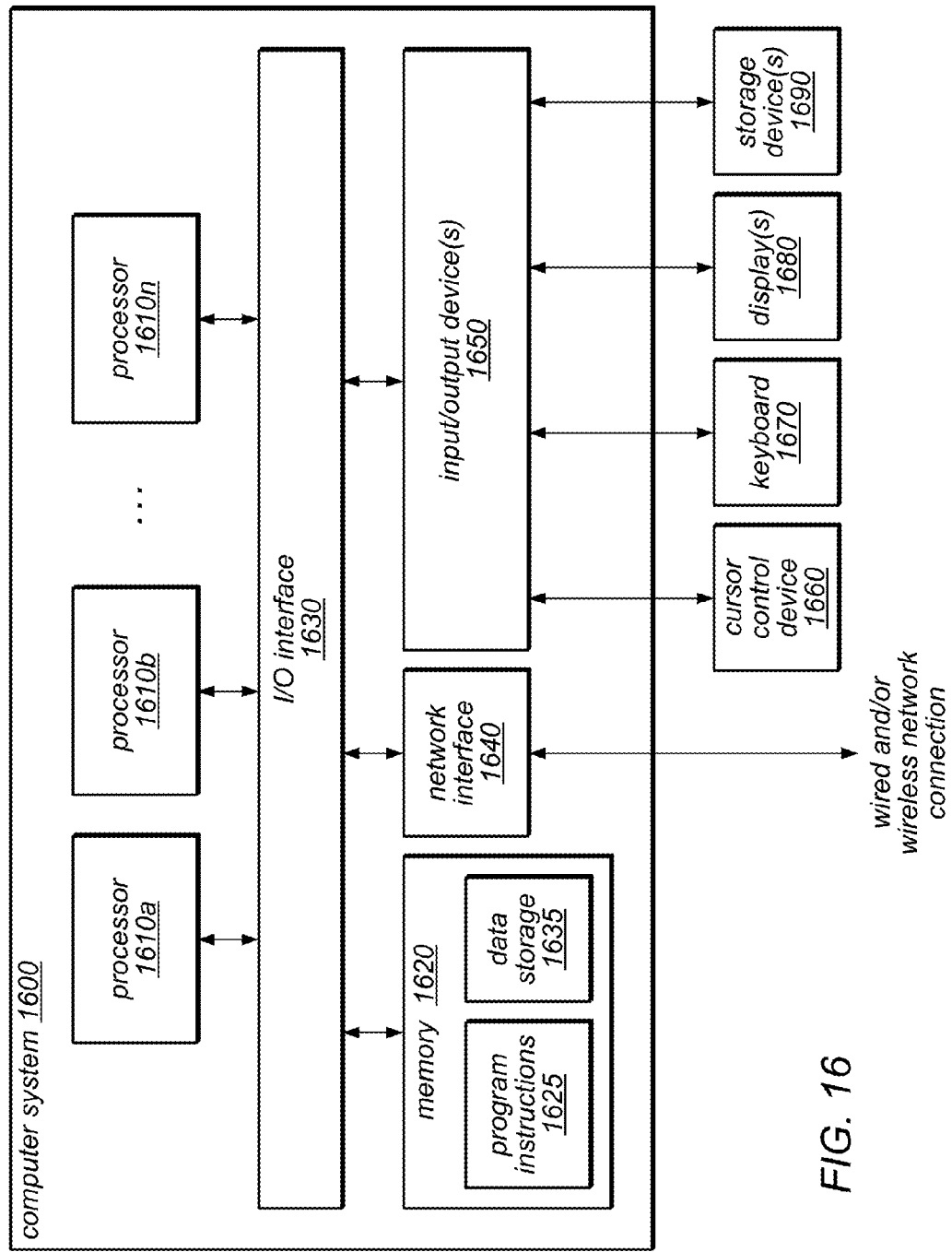
FIG. 16 is a block diagram illustrating an embodiment of a computer system.

One exemplary embodiment of a computer system including tangible, computer-accessible storage media is illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630. In different embodiments, system 1600 may be variously configured as a desktop computer system, a laptop or notebook or netbook computer, a mainframe computer system, a workstation, a network computer, a handheld computing device such as a personal digital assistant, cellular phone, media player, or combination device, a camera, a set top box, a mobile device, a consumer device, a video game console, a handheld video game device, an application server, a storage device, a peripheral device such as a printer, copy machine, switch, modem, or router, or another type of computing or electronic device.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1610 may commonly, but not necessarily, implement the same ISA.

System memory 1620 may be configured to store instructions and data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 1620 as program instructions 1625 and data storage 1635. It is noted that in some embodiments, program instructions 1625 and data storage 1635 may include instructions and data implementing desired functions that are not directly executable by processor 1610 but are represented or encoded in an abstract form that is translatable to instructions that are directly executable by processor 1610. For example, program instructions 1625 may include instructions specified in an ISA that may be emulated by processor 1610, or by other code executable on processor 1610. Alternatively, program instructions 1625 may include instructions, procedures or statements implemented in an abstract programming language that may be compiled or interpreted in the course of execution. As non-limiting examples, program instructions 1625 may include code specified in a procedural or object-oriented programming language such as C or C++, a scripting language such as Perl or Ruby or Python, a markup language such as HTML or XML, or any other suitable language.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functioning of I/O interface 1630, such as an interface to system memory 1620, may be incorporated directly into processor 1610.

Network interface 1640 may be configured to allow data to be exchanged between computer system 1600 and other devices attached to a network 1650, such as other computer systems or communications devices, for example. In particular, network interface 1640 may be configured to allow communication between computer system 1600 and various external devices. These external devices may include various computing and communications devices, which may include elements similar to those of computer system 1600. In particular, the external devices may include personal computers, telephony devices or network-attached computing devices that users may employ to access network services. Network interface 1640 may commonly support one or more wireless networking protocols (e.g., Wi-Fi/IEEE 802.11, or another wireless networking standard). However, in various embodiments, network interface 1640 may support communication via any suitable wired or wireless general data networks, such as other types of Ethernet network, for example. Additionally, network interface 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 1600 via I/O interface 1630. A computer-accessible medium may also include any volatile or non-volatile media such as RAM (e.g. SDRAM, DDR SDRAM, RDRAM, SRAM, etc.), ROM, etc, that may be included in some embodiments of computer system 1600 as system memory 1620 or another type of memory. A computer-accessible medium may generally be accessible via transmission media or signals such as electrical, electromagnetic, or digital signals, which may be conveyed via a communication medium such as a network and/or a wireless link, such as may be accessed via network interface 1640.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method comprising:
displaying a timeline in a marker region of a user interface for a video application, the timeline including a plurality of timeline markers that each specify an interval of the timeline;
detecting positioning of at least one additional timeline marker to specify an additional interval of the timeline, the at least one additional timeline marker defining an overlap of the additional interval with an interval of at least one of the plurality of timeline markers in the timeline; and
responsive to the detecting, automatically expanding the marker region to include first and second parallel tracks of the timeline separately and simultaneously in the user interface, the first and second parallel tracks having matching start and end points on the timeline, the first said track including the at least one of the plurality of timeline markers or the at least one additional timeline marker, the second said track including the other of the at least one additional timeline marker or the at least one of the plurality of timeline markers that are subject to the overlap.

2. A method as described in claim 1, wherein the at least one additional timeline marker is placed within the first said track of the timeline with one or more of the plurality of timeline markers.

3. A method as described in claim 1, wherein the positioning includes adding the at least one additional timeline marker to the timeline.

4. A method as described in claim 1, wherein the positioning involves repositioning of the at least one additional timeline marker in the timeline.

5. A method as described in claim 1, wherein the at least one additional timeline marker is displayed in the second said track, the method further comprising:
detecting an alteration to the at least one additional timeline marker of the second said track that causes removal of the additional interval from the second said track of the timeline; and
responsive to the detecting, automatically removing the second said track of the timeline from the user interface.

6. A method as described in claim 1, further comprising automatically grouping display tracks of the timeline that include timeline markers having a same type.

7. A method as described in claim 1, wherein each said timeline marker comprises an in point that corresponds to a starting point of a respective interval on the timeline and an out point that corresponds to a stopping point of the respective interval on the timeline.

8. One or more computer-readable storage devices comprising instructions stored thereon that, responsive to execution by a computer system, causes the computer system to perform operations comprising:

displaying a plurality of display tracks of a timeline in a user interface for a video application, each of the plurality of display tracks including a plurality of timeline markers that define intervals in the timeline;

shifting one or more of the plurality of timeline markers from a first said display track to a second said display track, the first said display track and the second said display track having matching start and end points on the timeline the shifting performed automatically responsive to an alteration of at least one said timeline marker that removes an overlap between a first interval and a second interval, said first interval defined by said plurality of timeline markers in said first display track, said second interval defined by said plurality of timeline markers in said second display track; and responsive to detecting that the first said display track does not include at least one timeline marker as a result of the shifting, removing the first said display track from display in the user interface.

9. One or more computer-readable storage devices as described in claim 8, wherein the alteration is performed to one or more said timeline markers in the first said display track of the timeline.

10. One or more computer-readable storage devices as described in claim 8, wherein the alteration is performed to one or more said timeline markers in the second said display track of the timeline.

11. One or more computer-readable storage devices as described in claim 8, wherein each said display track of the timeline represents media.

12. One or more computer-readable storage devices as described in claim 8, wherein the shifting is performed to automatically group one or more of the display tracks of the timeline that include timeline markers having a same type.

13. A computing system comprising:
one or more processors; and
memory having instructions stored thereon that, responsive to execution by the one or more processors, causes the one or more processors to perform operations comprising:

displaying a plurality of display tracks of a timeline in a user interface for a video application, each of the plurality of display tracks of the timeline including one or more timeline markers that each define an interval in a respective said display track of the timeline;

detecting an alteration based on a user input that modifies a timeline marker such that the alteration removes an overlap on the timeline between a first said interval and a second said interval, the first said interval defined by a first said timeline marker on a first said display track, the second said interval defined by a second said timeline marker on a second said display track, the alteration causing at least one said display track of the timeline to no longer include at least one timeline marker; and responsive to the detecting, automatically removing the at least one said display track of the timeline from display in the user interface.

14. A computing system as described in claim 13, wherein the alteration comprises one of the first said interval or the second said interval being shifted from the at least one said display track of the timeline to another said display track of the timeline.

15. A computing system as described in claim 13, wherein the alteration includes a modification to one or more timeline markers in the at least one display track of the timeline.

16. A computing system as described in claim 13, wherein the alteration includes a modification to one or more timeline markers in another said display track of the timeline.

17. A computing system as described in claim 13, wherein the operations further comprise automatically grouping, based on the alteration, one or more of the display tracks of the timeline that include timeline markers having a same type.

18. A computing system as described in claim 13, wherein each said timeline marker comprises an in point that defines a starting point of a corresponding interval and an out point that defines a stopping point of the corresponding interval.

19. A computing system as described in claim 13, wherein the plurality of display tracks of the timeline represent parallel, non-intersecting portions of the timeline.

20. A computing system as described in claim 13, wherein different types of timeline markers are displayed in one of said plurality of display tracks.

* * * * *